(12) United States Patent
Aramaki et al.

(10) Patent No.: US 7,595,578 B2
(45) Date of Patent: Sep. 29, 2009

(54) MOTOR, ROTARY ELECTRIC MACHINE AND ITS STATOR, AND METHOD FOR MANUFACTURING THE STATOR

(75) Inventors: Noriyuki Aramaki, Kiryu (JP); Masayuki Okubo, Kiryu (JP); Mikio Kawamura, Kiryu (JP); Takeshi Yamazaki, Kiryu (JP); Shuichi Fusegawa, Kiryu (JP); Tsugio Yokoo, Kiryu (JP)

(73) Assignee: Mistuba Corporation, Kiryu-shi (JP)

( * ) Notice: Subject to any disclaimer, the term of this patent is extended or adjusted under 35 U.S.C. 154(b) by 168 days.

(21) Appl. No.: 11/919,942

(22) PCT Filed: May 2, 2006

(86) PCT No.: PCT/JP2006/309156

§ 371 (c)(1),
(2), (4) Date: Nov. 5, 2007

(87) PCT Pub. No.: WO2006/120975

PCT Pub. Date: Nov. 16, 2006

(65) Prior Publication Data

US 2009/0066183 A1    Mar. 12, 2009

(30) Foreign Application Priority Data

May 6, 2005   (JP)   ............... 2005-134783
Mar. 13, 2006  (JP)  ............... 2006-067353

(51) Int. Cl.
H02K 1/18   (2006.01)
H02K 15/00  (2006.01)

(52) U.S. Cl. .................. 310/216; 310/217; 336/234; 29/603.01

(58) Field of Classification Search ......... 310/216–218; 336/212, 233–234; 29/596–598, 603.1, 603.2, 29/609
See application file for complete search history.

(56) References Cited

U.S. PATENT DOCUMENTS 6,219,900 B1 * 4/2001 Suzuki ................... 29/598

(Continued)

FOREIGN PATENT DOCUMENTS

JP    2001231190 A    * 8/2001

(Continued)

OTHER PUBLICATIONS

International Search Report, Jun. 6, 2006, from International Patent Application No. PCT/JP2006/309156, filed May 2, 2006.

*Primary Examiner*—Tran N Nguyen
(74) *Attorney, Agent, or Firm*—Kenyon & Kenyon LLP

(57) ABSTRACT

A laminated core segment 30 into which a stator core is split has a core main body 31 that extends in an arc shape. On one end section of the core main body 31 there is formed a connecting section 40, and on the other end section there is formed a connecting section 41. The connecting section 40 is able to connect with the connecting section 41 of another laminated segment 30. In the connecting section 40 there is provided a protruding protrusion section 48, and the protrusion section 48 interferes with an interference section 53 on the connecting section 41 side when the stator core 30 is forced towards the direction in which the stator core is split. As a result, an assembly operation of the stator core becomes easier, and a magnetically excellent connecting structure can be obtained.

16 Claims, 17 Drawing Sheets

U.S. PATENT DOCUMENTS

| | | |
|---|---|---|
| 6,362,553 B1 * | 3/2002 | Nakahara et al. ............. 310/254 |
| 6,538,548 B2 * | 3/2003 | Akita et al. ................. 336/234 |
| 6,870,292 B2 * | 3/2005 | Owada et al. ............... 310/194 |
| 7,345,397 B2 * | 3/2008 | Sheeran et al. .............. 310/217 |
| 7,378,774 B2 * | 5/2008 | Torii et al. ................. 310/216 |
| 7,382,075 B2 * | 6/2008 | Wang et al. ................ 310/194 |
| 2004/0051417 A1 * | 3/2004 | Yamazaki et al. ........... 310/216 |
| 2004/0195926 A1 * | 10/2004 | Hiwaki et al. .............. 310/216 |
| 2005/0200227 A1 * | 9/2005 | Fujishima et al. ........... 310/218 |
| 2006/0022544 A1 * | 2/2006 | Kinashi ...................... 310/179 |

FOREIGN PATENT DOCUMENTS

| | | |
|---|---|---|
| JP | 2002-218715 | 8/2002 |
| JP | 2002-369469 | 12/2002 |
| JP | 2003-102136 | 4/2003 |

\* cited by examiner

MOTOR, ROTARY ELECTRIC MACHINE AND ITS STATOR, AND METHOD FOR MANUFACTURING THE STATOR

TECHNICAL FIELD

The present invention relates to a motor having a stator core that can se split in the circumferential direction, in particular, to a rotary electric machine such as a motor and an electric generator, and also relates to a stator of a rotary electric machine having a stator that is split along the circumferential direction and to a manufacturing method thereof.

Priority is claimed on Japanese Patent Application No, 2005-134783, filed on May 6, 2005, and Japanese Patent Application No. 2006-67353, filed on Mar. 13, 2006, the contents of which are incorporated herein by reference.

BACKGROUND ART

There is a motor constructed such that a stator is formed by winding a coil around a stator core, and electric current supply to the coil is controlled, thereby rotating a rotor. In such a motor, it is commonly known that if the stator core is skewed, then uneven rotation of the rotor can be prevented.

Here, if the stator core is constructed to be splittable, the space factor of the coil winding can be improved, as a coil can be wound for each of the split laminated core segments. In the laminated core segment, a convex section for engagement is provided on one end section in the circumferential direction, and a concave section for engagement is provided on the other end section. When manufacturing the rotor, punched core segments are laminated while they are skewed, to manufacture the laminated core segment. After winding the coil, the laminated core segments are connected to the convex section and the concave section for engagement in the circumferential direction so as to form a circular shape. Furthermore, if connection sections are welded, the laminated core segments become a ring-shaped stator core (for example, refer to Patent Document 1).

On the other hand, conventionally, in rotary electric machines such as brushless motors, a stator side core in which magnetic steel plates punched in a substantially ring shape by presswork are laminated, is used. Among these rotary electric machines, in an inner rotor type brushless motor or the like, teeth sections on which coils are wound are formed on the inner circumference side of a core. However, at this time, if a stator core formed by laminating ring-shaped steel plates is used, the coils cannot be easily wound around the teeth sections that are provided so as to project in the inner circumferential direction. For this reason, in the inner rotor type rotary electric machine, the stator core is cut along the rotation shaft line to radially split it to form split core units, as disclosed in Patent Document 2. After that, the coil is wound for each of the split core units to make a plurality of stator segments, and these stator segments are assembled in a ring shape to form the stator.

FIG. 22 is a perspective view showing a construction of a stator segment 251. A plurality of the stator segments 251 is installed in the circumferential direction, thereby forming a stator 252 in a shape shown in outline by the chain line. The stator segment 251 is constructed such that a synthetic resin insulator 254 is attached to a split core unit (laminated core segment) 253 shown in FIG. 23, and a coil 255 is wound thereon. As shown in FIG. 24, the split core unit 253 is formed such that core pieces 257 formed by punching out from a magnetic steel plate 256 by pressing, are laminated. The core pieces 257 are laminated while displacing each one by a predetermined angle from the one before it, and the stator segment 251 is formed so as to have a shape slightly tilted with respect to the axial direction as shown in FIG. 22. The insulator 254 is mounted on the split core unit 253, and then a winding wire 258 is wound so as to form the coil 255. A plurality of the stator segments 251 is installed in the circumferential direction, forming the cylindrical stator 252. At this time, as a result of the inclination of the stator segments 251, a skew 259 is formed for preventing operating vibration and noise in the stator 252.

[Patent Document 1] Japanese Unexamined Patent Application, First Publication No. 2005-278298
[Patent Document 2] Japanese Unexamined Patent Application, First Publication No. 2003-304655
[Patent Document 3] Japanese Unexamined Patent Application, First Publication No. 2003-284269
[Patent Document 4] Japanese Unexamined Patent Application, First Publication No. 2001-300647
[Patent Document 5] Japanese Unexamined Patent Application, First Publication No. Hei 10-75552

SUMMARY OF INVENTION

[Problems to be Solved by the Invention]

However, since the skewed convex section and concave section are connected by welding or adhesive-bonding to fit the laminated core segment, operability in assembly of the stator core is low and productivity can not be improved. Moreover, a connected end section of the laminated core segment is used as a magnetic path of a magnetic circuit. However, if there is a welded portion or an adhesive-bonded portion on the end section, it influences the magnetic flux. Therefore, development of a connection form that does not involve welding or adhesive-bonding between the end sections has been in demand.

The present invention takes the above circumstances in consideration, and its primary object is to improve the productivity and quality of a skewed split type stator core.

Moreover, since the split core unit 253 shown in FIG. 23 is individually manufactured, a variation in the dimension of each unit inevitably occurs due to the plate thickness or an error in installation. For example, as shown in FIG. 25A, in the case where the lamination thickness of the units (axial direction dimension) is different, a vertical step X may occur in the connection section between the units, or a gap Y may occur between the units. In addition to the plate thickness tolerance of the steel plate, burrs and sags that may occur during pressing, cause a variation to occur in the lamination thickness, and the variation accumulates as the steel plates are laminated, so that a variation between the units is likely to become significant. Moreover, for example, as shown in FIG. 24B, in the case where there is an error in a skew angle, the gap Y may occur between the units. In particular, when a plurality of the split core units 253 are installed in the circumferential direction, the variation may accumulate and cause the gap to become more significant or cause the gap to be lost. That is to say, the gap Y itself that occurs between the units becomes nonconstant.

As described above, in the stator 252, the accuracy of the individual split core units 253 influences all aspects of the stator 252, and in particular, steps and gaps are likely to occur in the stator 252 having skews. When steps and gaps occur between the units and there is also a variation in the gaps, there is a problem in that a variation occurs in the magnetic flux within the stator, and the magnetic balance is impaired (becomes unbalanced), causing a reduction in the characteristics of the rotary electric machine.

For example, in the case where the stator is used in a motor, there is a problem in that a disturbance in the magnetic balance causes an increased cogging torque. In particular, in the case of using the motor as a driving source of an electric power steering device, when cogging becomes significant, it is transmitted to the operator via the steering wheel, causing a reduced steering feel, and an improvement in this has been needed.

Therefore, a secondary objective of the present invention is to improve the level of dimensional accuracy of the split core unit while reducing a dimensional variation during installation to improve the characteristics of the rotary electric machine.

[Means for Solving the Problems]

A first aspect of the present invention for solving the above problems is a motor having a stator core formed by combining laminated core segments, which are laminated while the core segments are skewed, in a ring shape, wherein a convex section is provided on one end section in the circumferential direction of the laminated core segment, and a concave section is provided on the other end section in the circumferential direction so as to be able to connect in the circumferential direction to the convex section of another laminated core segment, and the convex section and the concave section have interference sections that cause the convex section and the concave section to interfere with each other due to the skew in the laminated core segment when a force that acts to separate the convex section and the concave section from each other is displaced from the circumferential direction.

In this motor, when a force that acts to split the split type stator core into the respective laminated core segments occurs, making use of the fact that the movement direction of the convex section or the concave section displaces due to the skewing, an engaging force is generated by making the convex section and the concave section interfere with each other in such a movement direction.

A second aspect of the present invention is characterized in that in the motor according to the first aspect, the interference sections are a protrusion section that partially protrudes between the tip end and the base end of the convex section, and an end section formed on the concave section so as to correspond to the protrusion section.

In this motor, the protrusion section interferes with the end section that is formed to be able to interfere with the protrusion section. As a result, an engaging force is generated.

A third aspect of the present invention is characterized in that in the motor according to the second aspect, the protrusion section protrudes from an imaginary line that passes through a corner section of the tip end of the convex section and that inclines by an angle half of the skew angle with respect to the circumferential direction so as to open towards the base end side of the convex section.

In this motor, in the case where the lamination center of the laminated core segment is taken as a reference, the convex sections and the concave sections can be made to interfere with each other on both of the end sections.

A fourth aspect of the present invention is characterized in that in the first to third motors according to the present invention, the interference sections are formed respectively on the inner circumference side and on the outer circumference side of the convex section and the concave section.

In this motor, since the interference sections are provided respectively on the inner circumference side and on the outer circumference side, engaging forces occur respectively on both of the end sections in the circumferential direction of the laminated core segment. These engaging forces mutually act as reactive forces, and therefore the shape of the stator core can be retained easily.

A fifth aspect of the present invention is characterized in that in the first to fourth motors according to the present invention, the interference sections have shapes that do not cause interference when the convex section and the concave section are moved in the circumferential direction.

In this motor, the convex section and the concave section can be separated from each other in the circumferential direction without the interference sections acting.

A sixth aspect of the present invention is a stator of a rotary electric machine arranged on the outer circumference side of a rotor provided with a permanent magnet, in which a plurality of split core units are disposed along the circumferential direction in a ring shape, and is characterized in that the split core unit is formed by splitting, along the circumferential direction, the stator core formed by laminating a plurality of ring-shaped plate members, and the stator is formed by re-connecting the core units that have been split-formed from the same stator core and that have individually had winding wires wound thereon, in a combination the same as that at the time of splitting.

In this stator, since the stator is formed by re-connecting the split core units split-formed from the same stator core in a combination the same as that at the time of splitting, the split core units adjacent to each other are connected to the split core units the same as those at the time prior to splitting, thereby improving the accuracy of the connection between the connection faces of both split core units. Accordingly, displacement or rattling that occurs in the connection section between the split core units can be suppressed, and the split core units can be connected to each other without having gaps therebetween.

Therefore steps or uneven gaps between the split core units can be prevented

In the above mentioned stator, arrangement displays that show the state of the combination at the time of splitting may be provided on the split core units. As a result, the split core units can be easily and correctly installed in the original combination.

A seventh aspect of the present invention is a stator of a rotary electric machine arranged on the outer circumference side of a rotor provided with a permanent magnet in which a plurality of split core units formed by laminating a plurality of core pieces, is disposed along the circumferential direction in a ring shape, and is characterized in that the split core units are formed by splitting, along the circumferential direction, a stator core that is formed by laminating a plurality of ring-shaped plate members in which the core pieces are connected along the circumferential direction, and the core piece has connection sections that are cut-formed from a steel plate member by half-blanking the steel plate member, on which the plate member is formed, from one face side and then pressing it from the other face side, and the connection sections connect the core pieces adjacent to each other.

In this stator, since the connection section between the split core units is formed by half-blanking the steel plate member, on which the plate member is formed, from one face side and then pressing it from the other face side, burrs are unlikely to occur on the connection face and a variation in the thickness of the core piece is suppressed, resulting in an improvement in the flatness of the core piece and the accuracy of the connection section. Accordingly, the lamination thickness of the respective split core units can be equalized and displacement or rattling in the connection section can be prevented as a result. Therefore, steps or uneven gaps between the split core units can be prevented.

In the above mentioned stator, engaging sections to and from which the core pieces can be attached or removed may be provided in the connection section. Moreover, a cut-assisting hole may be provided adjacent to a portion of the steel plate member in which the connection section is formed.

An eighth aspect of the present invention is a manufacturing method of a stator of a rotary electric machine arranged on the outer circumference side of a rotor provided with a permanent magnet in which a plurality of split core units are disposed along the circumferential direction in a ring shape, and is characterized in that the split core units are formed by splitting, in the circumferential direction, a stator core that is formed by laminating a plurality of ring-shaped plate members, and a winding wire is individually wound on the split core units, and then the split core units, which have been split-formed from the same stator core, are re-connected in a combination the same as that at the time of splitting to form the stator.

In this method, since the stator is manufactured by re-connecting the split core units, which are split-formed from the same stator core, in a combination the same as that at the time of splitting, the split core units adjacent to each other are connected to the split core units the same as those at the time prior to splitting, thereby improving the accuracy of the connection between the connection faces of both split core units. Accordingly, displacement or rattling that occurs in the connection section between the split core units can be suppressed, and the split core units can be connected to each other without having gaps therebetween. Therefore, steps or uneven gaps between the split core units can be prevented.

A ninth aspect of the present invention is a manufacturing method of a stator of a rotary electric machine arranged on the outer circumference side of a rotor provided with a permanent magnet in which a plurality of split core units formed by laminating a plurality of core pieces are disposed in a ring shape along the circumferential directions, and is characterized in that a ring-shaped plate member in which the core pieces are connected in the circumferential direction is punch-formed from a steel plate member, and the steel plate member is half-blanked from one face side, and is then pressed from the other face side, thereby cut-forming from the steel plate member, connection sections in between the adjacent core pieces for connecting the core pieces. Furthermore the stator core is formed by laminating a plurality of the plate members, and the stator core is split to form the laminated core unit.

In this method, since the connection section between the split core units is formed by half-blanking the steel plate member, on which the plate member is formed, from one face side and then pressing from the other face side, burrs are unlikely to occur on the connection face between the split core units, and a variation in the thickness of the core piece is suppressed, resulting in an improvement in the flatness of the core piece and the accuracy of the connection section. Accordingly, the lamination thickness of the respective split core units can be equalized and displacement or rattling in the connection section can be prevented as a result. Therefore, steps or uneven gaps between the split core units can be prevented.

A tenth aspect of the present invention is a rotary electric machine having a rotor provided with a permanent magnet, and a stator arranged on the outer circumference side of the rotor, in which a plurality of split core units is disposed along the circumferential direction in a ring shape, and is characterized in that the split core units are formed by splitting, along the circumferential direction, a stator core formed by laminating a plurality of ring-shaped plate members, and the stator is formed by re-connecting the core units, which have been split-formed from the same stator core and which have individually had winding wires wound thereon, in a combination the same as that at the time of splitting.

In this rotary electric machine, since the stator is used by re-connecting the split cove units split-formed from the same stator core in a combination the same as that at the time of splitting, the split core units adjacent to each other are connected to the split core units the same as those at the time prior to splitting, thereby improving the accuracy of the connection between the connection faces of both split core units. Accordingly, displacement or rattling that occurs in the connection section between the split core units can be suppressed, and the split core units can be connected to each other without having gaps therebetween. Therefore, steps or uneven gaps between the split core units can be prevented.

An eleventh aspect of the present invention is a rotary electric machine having a rotor provided with a permanent magnet, and a stator arranged on the outer circumference side of the rotor, in which a plurality of split core units is disposed along the circumferential direction in a ring shape, and is characterized in that the split core units are formed by splitting, along the circumferential direction, a stator core that is formed by laminating a plurality of ring-shaped plate members in which the core pieces are connected along the circumferential direction, and the core pieces have connection sections that are cut-formed from a steel plate member by half-blanking the steel plate member, on which the plate member is formed, from one face side and then pressing it from the other face side, and the connection sections connect the core pieces adjacent to each other.

In this rotary electric machine, since the connection section between the split core units is formed by half-blanking the steel plate member, on which the plate member is formed, from one face side and then pressing from the other face side, burrs are unlikely to occur on the connection face and a variation in the thickness of the core piece is suppressed, resulting in an improvement in the flatness of the core piece and the accuracy of the connection section. Accordingly, the lamination thickness of the respective split core units can be equalized, and displacement or rattling in the connection section can be prevented as a result. Therefore, steps or uneven gaps between the split core units can be prevented.

[Effect Of The Invention]

According to the motor of the present invention, since an engaging force occurs as a result of interference between the convex section and the concave section when the direction in which a force that acts to split the stator core is displaced due to skewing in the laminated core segments, the laminated core segments can be connected to each other without welding or adhesive-bonding as conventionally practiced. As a result, the assembly operation of the stator core becomes easier, and a magnetically excellent connecting structure can be obtained.

According to the stator of the rotary electric machine of the present invention, since the split core unit is formed by splitting, along the circumferential direction, the stator core formed by laminating a plurality of the ring-shaped plate members, and forming the stator by re-connecting the split core units, which have been split-formed from the same stator core, in a combination the same as that at the time of splitting, the adjacent split core units are connected to the split core units the same as those at the time prior to splitting, thereby enabling an improvement in the accuracy of the connection between the split core units. As a result, displacement or rattling that occurs in the connection section between the split core units can be suppressed, and steps or uneven gaps between the split core units can be prevented. Therefore, a variation in magnetic flux within the stator caused by steps in the split core units or uneven gaps can be suppressed, and a reduction in the characteristics of the rotary electric machine due to an impaired magnetic balance and a cogging torque can be reduced.

According to the stator of another rotary electric machine of the present invention, the split core unit is formed by splitting, along the circumferential direction, the stator core formed by laminating a plurality of the ring-shaped plate members in which the core pieces are connected along the circumferential direction, and the connection sections are cut-formed in the core piece by half-blanking the steel plate member, on which the plate member is formed, from one face side and then pressing it from the other face side. As a result, burrs in the connection face between the split core units can be prevented, and a variation in the thickness of the core piece can be suppressed, thereby enabling an improvement in the flatness of the core piece and the accuracy of the connection section. As a result, the lamination thickness of the respective split core units can be equalized and displacement or rattling in the connection section can be suppressed, enabling prevention of steps or uneven gaps between the split core units. Therefore, a variation in magnetic flux within the stator caused by steps in the split core units or uneven gaps can be suppressed, and a reduction in the characteristics of the rotary electric machine due to an impaired magnetic balance and a cogging torque can be reduced.

According to the manufacturing method of the stator of the rotary electric machine of the present invention, since the split core unit is formed by splitting, along the circumferential direction, the stator core formed by laminating a plurality of the ring-shaped plate members, and forming the stator by reconnecting the spilt core units, which have been split-formed from the same stator core, in a combination the same as that at the lime of splitting, the adjacent split core units are connected to the split core units the same as those at the time prior to splitting, thereby enabling an improvement in the accuracy of the connection between the split core units. As a result, displacement or rattling that occurs in the connection section between the split core units can be suppressed, and steps or uneven gaps between the split core units can be prevented. Therefore, a variation in magnetic flux within the stator caused by steps or uneven gaps in the split core units can be suppressed, and a reduction in the characteristics of the rotary electric machine due to an impaired magnetic balance and a cogging torque can be reduced.

According to the manufacturing method of the stator of another rotary electric machine of the present invention, the ring-shaped plate member in which the core pieces are connected in the circumferential direction is punch-formed from the steel plate member, and the steel plate member is half-blanked from one face side, and is then pressed from the other face side, thereby forming the connection section that connects the core pieces in between the adjacent core pieces. The stator core is formed by laminating a plurality of the plate members, and the stator core is split to form the split core unit. As a result, burrs in the connection face between the split core units can be prevented, and a variation in the thickness of the core piece can be suppressed, thereby enabling an improvement in the flatness of the core piece and the accuracy of the connection section. As a result, the lamination thickness of the respective split core units can be equalized and displacement or rattling in the connection section can be suppressed, enabling prevention of steps or uneven gaps between the split core units. Therefore, a variation in magnetic flux within the stator caused by steps or uneven gaps in the split core units can be suppressed, and a reduction in the characteristics of the rotary electric machine due to an impaired magnetic balance and a cogging torque can be reduced.

According to the rotary electric machine of the present invention, since the split core unit is formed by splitting, along the circumferential direction, the stator core formed by laminating a plurality of the ring-shaped plate members, and forming the stator by re-connecting the split core units, which have been split-formed from the same stator core, in a combination the same as that at the time of splitting, the adjacent split core units are connected to the split core units the same as those at the time prior to splitting, thereby enabling an improvement in the accuracy of the connection between the split core units. As a result, displacement or rattling that occurs in the connection section between the split core unit can be suppressed, and steps or uneven gaps between the split core units can be prevented. Therefore, a variation in magnetic flux within the stator caused by steps in the split core units or uneven gaps can be suppressed, and a reduction in the characteristics of the rotary electric machine due to an impaired magnetic balance and a cogging torque can be reduced.

According to another rotary electric machine of the present invention, the split core unit is formed by splitting, along the circumferential direction, the stator core formed by laminating a plurality of the ring-shaped plate members in which the core pieces are connected along the circumferential direction, and the connection sections are provided in the core piece by half-blanking the steel plate member on which the plate member is formed from one face side and then pressing it from the other face side so as to connect the adjacent core pieces to this connection section. As a result, burr in the connection face between the split core units can be prevented, and a variation in the thickness of the core piece can be suppressed, enabling an improvement in the flatness of the core piece and the accuracy of the connection section. As a result, the lamination thickness of the respective split core units can be equalized and displacement or rattling in the connection section can be suppressed, enabling prevention of steps or uneven gaps between the split core units. Therefore, a variation in magnetic flux within the stator caused by steps in the split core units or uneven gaps can be suppressed, and a reduction in the characteristics of the rotary electric machine due to an impaired magnetic balance and a cogging torque can be reduced.

BRIEF DESCRIPTION OF THE REFERENCE SYMBOLS

Figure 1:
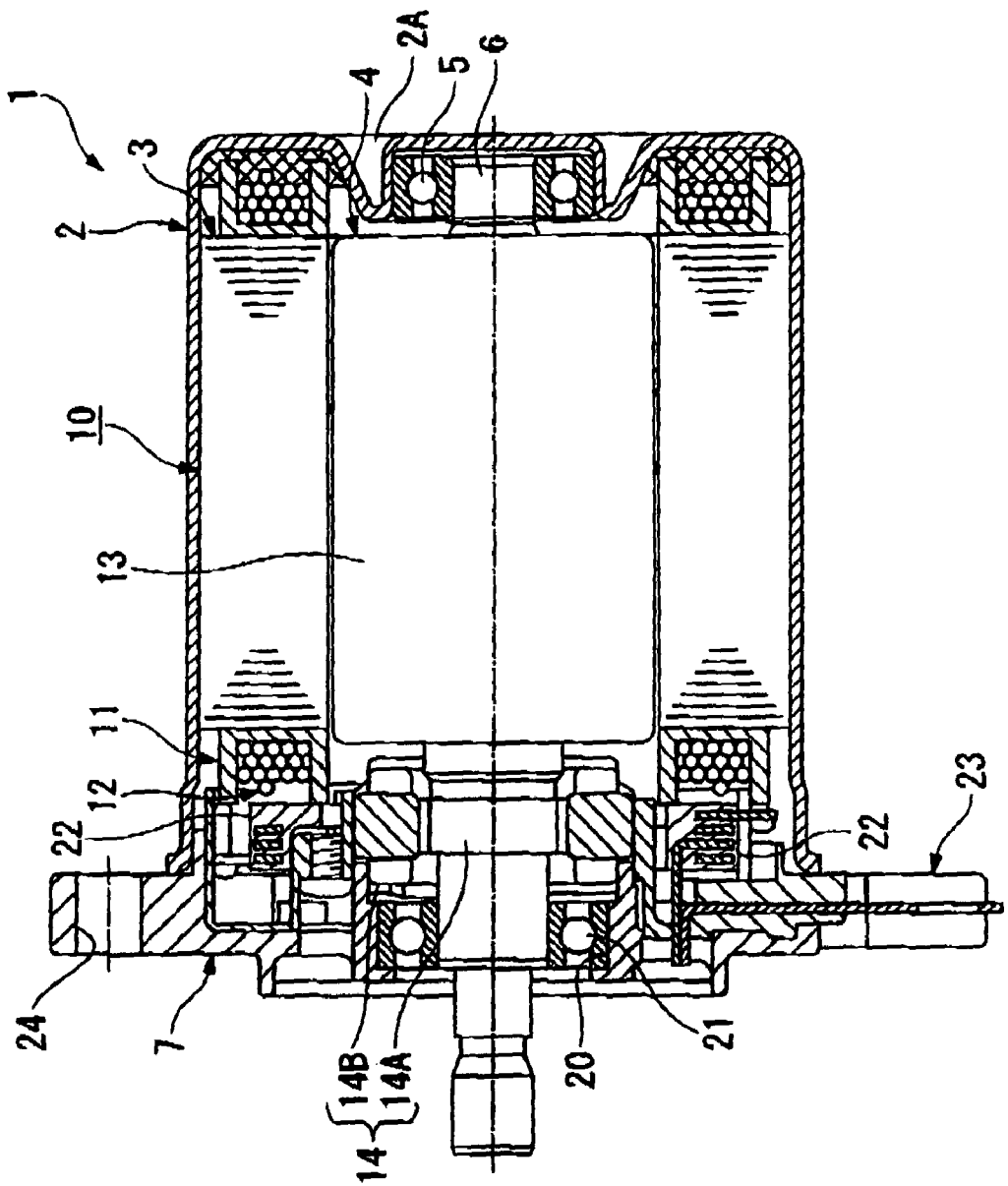
FIG. 1 is a sectional view showing a construction of a motor having a split type stator core according to an embodiment of the present invention.

1 Motor
3 Stator
10 Stator core
30 Laminated core segment
45, 61, 71 Convex section
47A, 61A, 71A Corner section
48, 62, 72 Protrusion section (interference section)
50 Concave section
53, 67, 77 Interference section (end section)
C1, C2, C3, C4 Imaginary line
a Skew angle
101 Brushless motor (rotary electric machine)
102 Case
103, 113, 152 Stator
104 Rotor
105 Rotation shaft
106 Rotor core
107 Permanent magnet
108, 112 Bearing
109 Rotation angle detection device
110 Rotor
111 Bracket
114, 155 Coil
115, 158 Coil winding
116 Terminal
117, 159 Skew
121, 151 Stator segment
122, 157 Core piece
122a Circumference side section
122b Teeth section
123, 153 Split core unit (laminated core segment)
124, 154 Insulator
125 Slot
126, 126a, 126b Connection section
131 Piece plate (plate member)
132 Magnetic steel plate (steel plate member)
133 Boss
134 Slot formation section
135 Inner diameter section
136 Rectangular hole
137 Connection line
138 Connection face
139 Punch
141 Flat punch
142 Flat die
143 Outer engagement segment
144 Inner engagement segment
145 Stator core
145a Top face
146 Unit number (arrangement display)
156 Magnetic steel plate

DETAILED DESCRIPTION OF THE INVENTION

Hereinafter, embodiments of the present invention are described in detail, with reference to accompanying drawings.

As shown in FIG. 1, a motor 1 is a brushless motor having a stator 3 and a rotor 4 press-fitted inside a housing 2.

The housing 2 is of a bottom ended cylindrical shape, on the inner circumference of the cylindrical portion of which there is press-fitted the stator 3. On the center portion of an end section (bottom section) of the housing 2, there is press-fitted a bearing 5. In this bearing 5, there is freely rotatably supported a rotation shaft 6 of the rotor 4. An opening section of the housing 2 is closed by a bracket 7.

The stator 3 has a substantially ring-shaped stator core 10, and after mounting an insulator 11 on the stator core 10, a coil 12 is wound thereon.

In the rotor, a magnet 13 and a resolver rotor 14A of a resolver 14 for position detection are arranged in this order on the rotation shaft 6. The magnet 13 is magnetized so that magnetic poles change in sequence in the circumferential direction.

The bracket 7 is of a disk shape, in the center of which there is formed a hole 20, and in the hole 20 there is fixed a bearing 21 that freely rotatably supports the rotation shaft 6. Furthermore, a resolver stator 14B that constructs the resolver 14 is fixed in line with the position of the resolver rotor 14A so that the rotational position of the resolver rotor 14A rotating integrally with the rotation shaft 6 can be detected. Moreover, in the bracket 7, there is arranged a terminal 22 connected to a conducting wire of the coil 12 on the stator 3 side. To the terminal 22, electric current can be supplied from an external power supply via a connector section 23 provided in a projecting state on the outer circumference section of the bracket 7. Also on the circumference section of the bracket 7, there is provided in a projecting state a bolt hole 24 to be used for fixing the motor 1.

Figure 2:
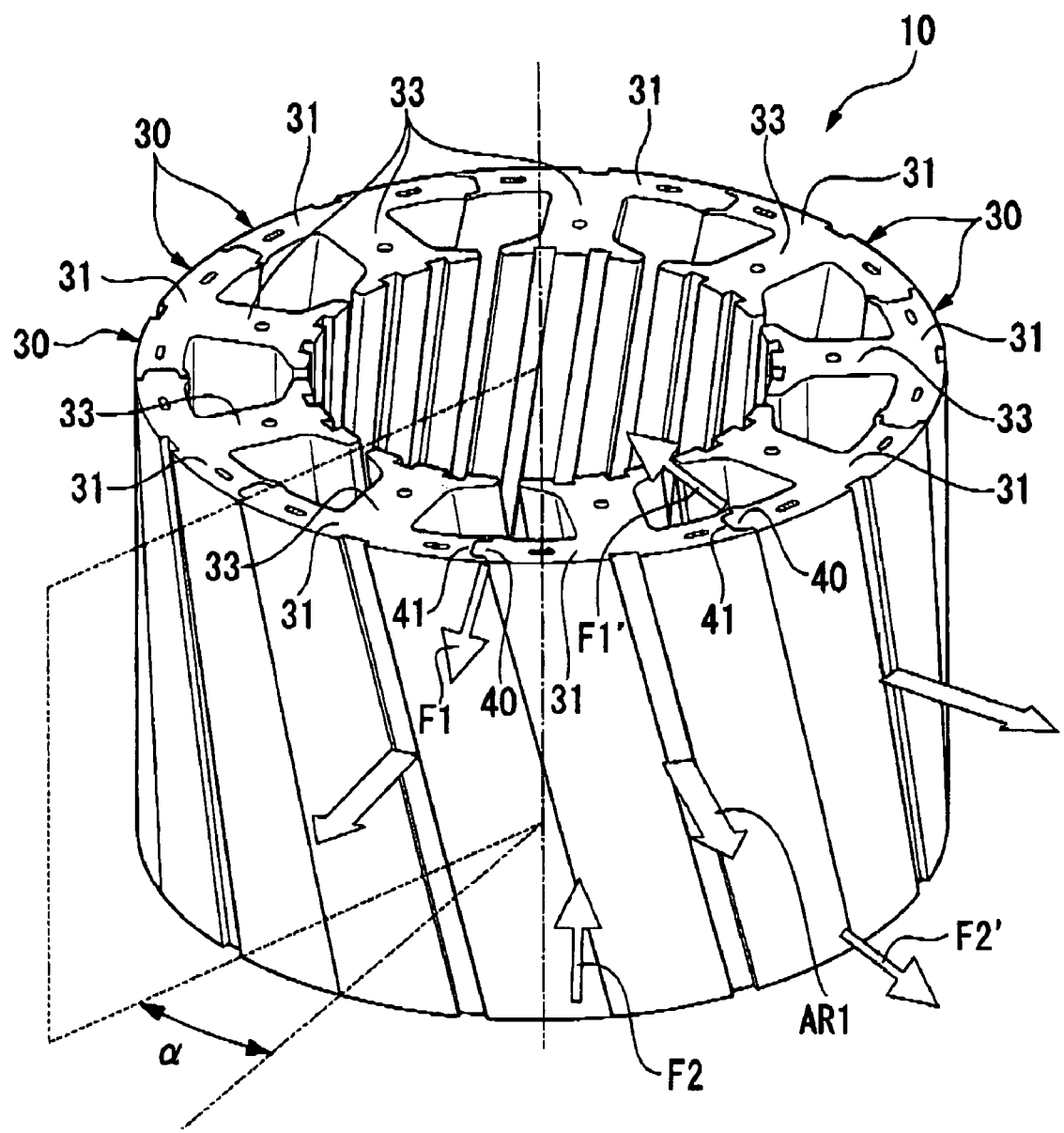
FIG. 2 is a perspective view of the stator core.

Here, the stator core 10 uses a split core type that enables splitting in the circumferential direction. As shown in FIG. 2, laminated core segments 30 that form the stator core 10 have a core main body 31 extending in the circumferential direction. The core main body 31 is a portion on which a ring-shaped magnetic path of the stator core 10 is formed, and is also a portion that is press-fitted onto the inner circumference face of the housing 20. The core main body 31 has a predetermined skew angle a so that it twists and tilts with respect to the lengthwise direction (shaft line of the motor) of the stator core 10. A teeth section 33, which is a salient pole, is provided in the substantially center of the core main body 31 so as to extend towards the center of rotation.

Figure 3:
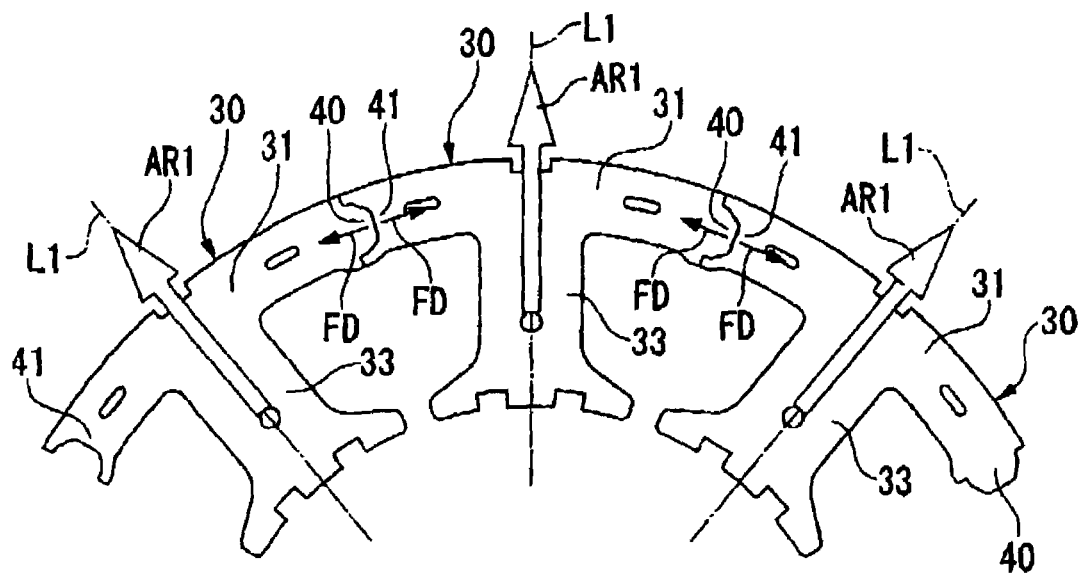
FIG. 3 is a drawing showing an arrangement of a laminated core segment in the center in a lamination direction.
Figure 4:
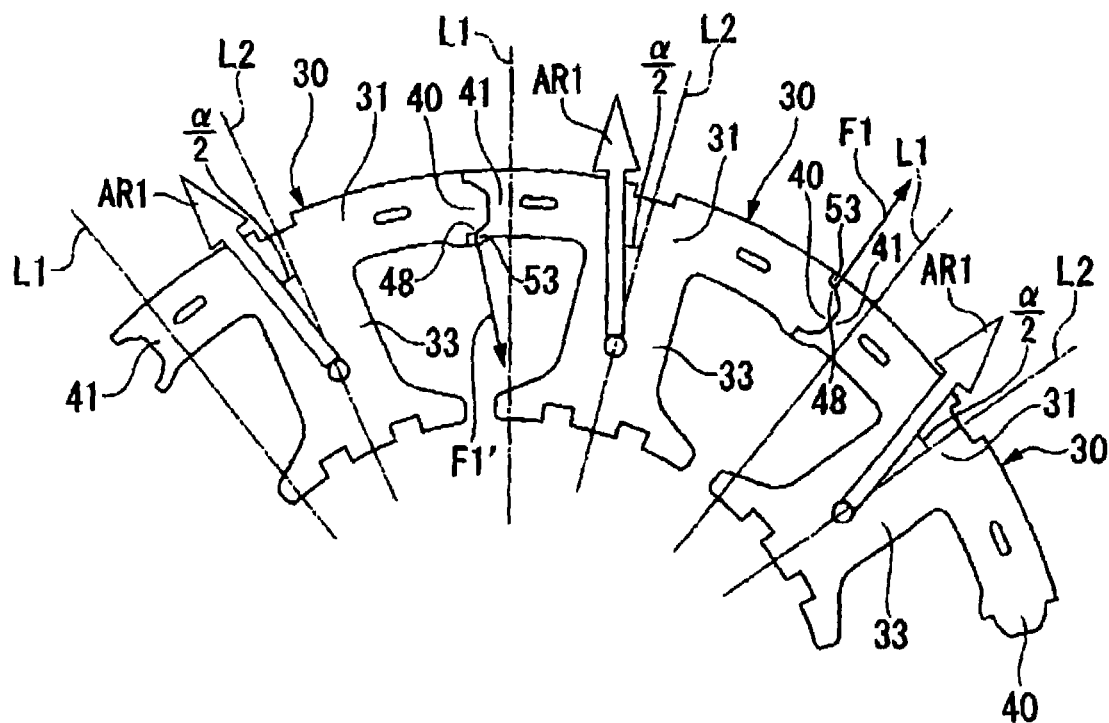
FIG. 4 is a drawing showing an arrangement of a laminated core segment on the top end in the lamination direction.
Figure 5:
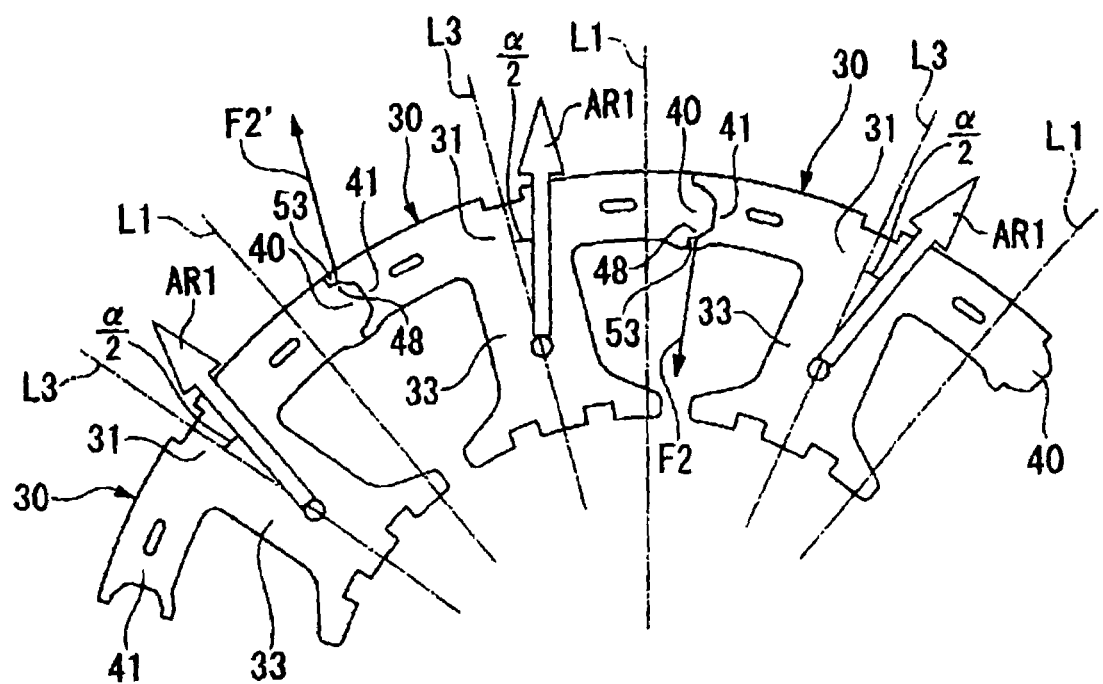
FIG. 5 is a drawing showing an arrangement of a laminated core segment on the bottom end in the lamination direction.

As shown in FIG. 2 and FIG. 3, one end section of the core main body 31 in the circumferential direction is a connecting section 40 that press-engages with another laminated core segment 30, and the other end section is a connecting section 41. The laminated core segment 30 is manufactured by laminating metallic core segments, and its bottom end section and its top end section are respectively arranged in positions displaced by a/2 with respect to the center of the lamination direction. As shown in FIG. 2 and FIG. 4, the top end section of the laminated core segment 30 is displaced in the circumferential direction by an 2 counterclockwise with respect to the center portion. As shown in FIG. 2 and FIG. 5, the bottom end section of the laminated core segment 30 is arranged in a position displaced in the circumferential direction by a/2 clockwise with respect to the center portion.

Figure 6:
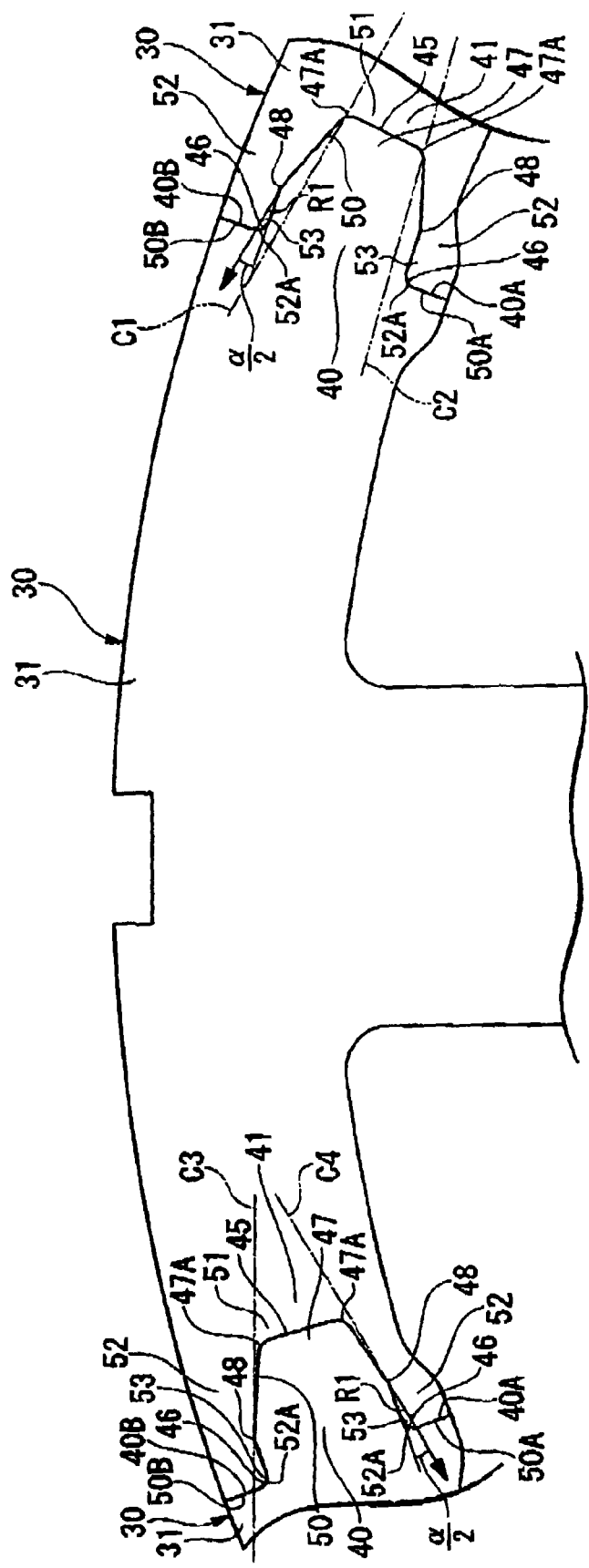
FIG. 6 is an enlarged view of the laminated core segment on the top end in the lamination direction.

As shown in FIG. 6, the connecting section 40 on one end section side of the laminated core segment 30 has a convex section 45 that projects in the circumferential direction from an abutting face 40A on the inner circumference side and an abutting face 40B on the outer circumference side. The convex section 45 forms a base end section 46 that continues from each of the abutting faces 40A and 40B with smooth curved lines, and then extends substantially along the circumferential direction so that its width in the circumferential direction stays substantially the same, reaching a tip end section 47 while reducing its width from partway. The portion in which the convex section 45 begins to reduce its width is a protrusion section 48 (interference section) that protrudes outward. One of the protrusion sections 48 is provided on each of the inner circumference side and the outer circumference side.

The protrusion section 48 on the outer circumference side protrudes outward in the radial direction from an imaginary line between a corner section 47A of the tip end section 47 and the base end section 46. In further detail, the imaginary line between the corner section 47A and the base end section 46 is inclined so as to open towards the base end section 46, and the angle of this inclination is greater than a half of the skew Angle (a/2) with respect to the tangent line in the circumferential direction. That is to say, the protrusion section 48 on the outer circumference side is provided on the outer circumference side to an imaginary line C1 that passes through the corner section 47A on the outer circumference side of the tip end section 47 of the convex section 45 and that inclines so as to open with respect to the tangent line in the circumferential direction at an angle of a/2.

Similarly, the protrusion section 48 on the inner circumference side is provided on the inner circumference side to an imaginary line C2 that passes through the corner section 47A on the inner circumference side of the tip end section 47 of the convex section 45 and that inclines so as to open with respect to the tangent line in the circumferential direction at an angle of a/2.

In the connecting section 41 on the other end section side, there is formed a concave section 50 with a pair of arm sections 52, on the inner circumference side and the outer circumference side of which there are respectively formed abutting faces 50A and 50B. The concave section 50 has a shape that can receive the convex section 45. The respective end sections on opening ends 52A of the arm sections 52 have interference sections 53 that protrude so as to reduce the width between the opening ends 52A. The distance between the interference section 53 on the outer circumference side and the interference section 53 on the inner circumference side is substantially constant. The interference section 53 on the outer circumference side protrudes inward front an imaginary line C3 that passes through the vertex of the protrusion section 48 on the convex section 45 side and that opens with respect to the circumferential direction at an inclination angle a/2. Similarly, the interference section 53 on the inner circumference side protrudes inward from an imaginary line C4 that passes through the vertex of the protrusion section 48 on the convex section 45 side and that opens with respect to the circumferential direction at an inclination angle a/2.

Effects of this embodiment are descried.

When manufacturing the motor 1, a core segment is punched out from a metallic plate so as to fit the shape of the laminated core segment 30. On the core segment there are provided for example a concave section and a convex section, and when the concave section and the convex section of the core segments are engaged with each other while being skewed, a number of core segments are laminated so as to become the laminated core segment 30. As shown in FIG. 2, the connecting sections of the laminated core segments 30 are connected together to form the stator core 10.

Here, when a radial direction outward force acts on the portion in the vicinity of the center in the lamination direction, a force shown by the arrow AR1 acts respectively on the center section of each of the laminated core segments 30 in the radial direction outward. When looking at the laminated core segment 30 as a whole, this force AR1 acts in the direction in which the respective laminated core segments 30 are split in the radial direction outward, taking an axis line of the stator core 10 as a center.

In the center section in the lengthwise direction shown in FIG. 3, the force AR1 acts substantially parallel with a radial direction L1. As a result, forces FD that act to separate the convex section 45 and the concave section 50 from each other in the circumferential direction act on the connecting sections 40 and 41. At this time, since the protrusion section 48 and the interference section 53 form a shape substantially along the circumferential direction and do not interfere with each other, a bonding force does not act therebetween.

As shown in FIG. 4, on the top end section of the laminated core segment 30, the force AR1 has a vector that inclines by a/2 counterclockwise with respect to a radial direction 12 along the teeth section 33 where the top end section of the laminated core segment 30 is taken as a reference. As a result, as shown by the arrow in FIG. 6, the convex section 45 on the outside is forced in the outward direction by a/2 with respect to the circumference direction. However, since on the path on which the protrusion section 48 on the outer circumference side is forced towards, there is the interference section 53 of another laminated core segment 30, the protrusion section 48 on the outer circumference side is interfered with by the interference section 53. As a result, as shown in FIG. 2 and FIG. 4, the convex section 45 of the connecting section 40 presses the interference section 53 with a force shown by the arrow F1 and this force serves as a bonding force.

In the other connecting section 41, the interference section 53 on the inside interferes with the protrusion section 48 of another laminated core segment 30 and is pressed inward by a/2 with respect to the circumferential direction. Accordingly, in the other connecting section 41, a bonding force shown by the arrow F1' occurs. The magnitude of this bonding force is equivalent to that of the above mentioned force F1, and the direction of the bonding force is opposite to that of the force F1 (that is, a reactive force). Therefore, on the top end section of the laminated core segment 30, the bonding forces are offset between these two connecting sections 40 and 41.

Moreover, as shown in FIG. 5, on the bottom end section of the laminated core segment 30, the force AR1 has a vector that inclines by a/2 clockwise with respect to a radial direction 13 along the teeth section 33 where the bottom end section of the laminated core segment 30 is taken as a reference. Accordingly, in the convex section 45, the protrusion section 48 is forced in the inward direction by a/2 with respect to the circumferential direction. However, since on the path on which the protrusion section 48 on the inner circumference side is forced towards, there is the interference section 53 of another laminated core segment 30, the protrusion section 48 is interfered with by the interference section 53. The convex section 45 of the connecting section 40 presses the interference section 53 inward with a force shown by the arrow F2, and this force serves as a bonding force.

In the other connecting section 41, the interference section 53 on the outside interferes with the protrusion section 48 of another laminated core segment 30 and is pressed outward by a/2 with respect to the circumferential direction. Accordingly, in the other connecting section 41, a bonding force shown by the arrow F2' occurs. The magnitude of this bonding force is equivalent to that of the above mentioned force F2, and the direction of the bonding force is opposite to that of the force F2 (that is, a reactive force). Therefore, on the bottom end section of the laminated core segment 30, the bonding forces are offset between these two connecting sections 40 and 41.

Figure 7:
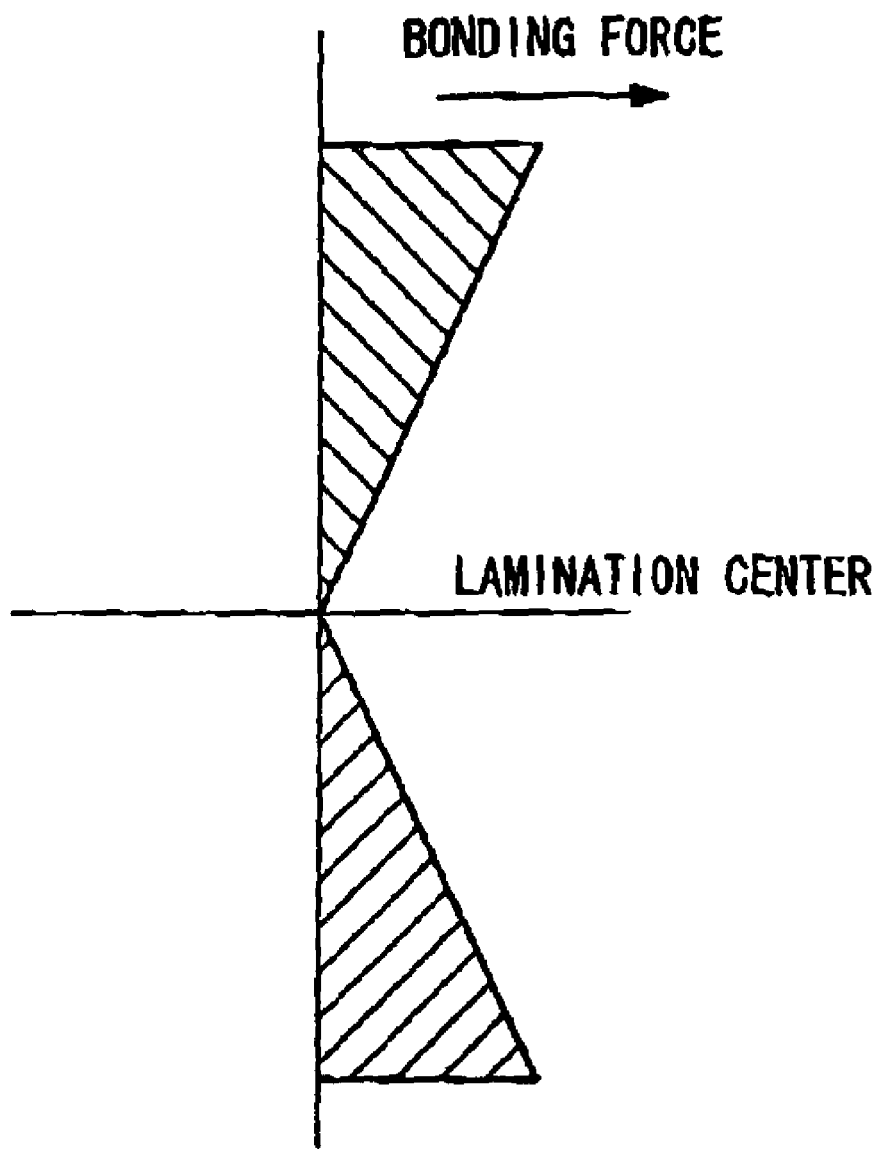
FIG. 7 is a drawing schematically showing changes in a bonding force between the laminated core segments in the lamination direction.

As described above, in the laminated core segment 30, the bonding forces of the connecting sections 40 and 41 offset each other respectively on the top end side and on the bottom end side. Furthermore, as shown in FIG. 7, the bonding force does not cause an engaging force to occur in the center of the lamination as mentioned above, and it becomes greater as it gets away from the center of the lamination. This is because, the direction in which the protrusion section 48 is forced towards gets closer to the circumferential direction when being close to the center of the lamination, and a region of interference with the interference section 53 becomes smaller as a result, and as it gets away from the center of the lamination, the protrusion section 48 and the interference section 53 begin to interfere with each other due to the skew angle, resulting in an increase in the bonding force. However, since the bonding forces offset each other on both of the end sections in one laminated core segment 30, the stator core 10 is not split into the respective laminated core segments 30 and maintains its original shape.

Here, in the case where the force that acts to separate the connecting sections 40 and 41 from each other is a sufficient force (pinching force) for the protrusion section 48 of the connecting section 40 to elastically deform the connecting section 41, the engagement between the connecting sections 40 and 41 is released and the laminated core segments 30 are respectively split. After mounting the insulator 11 on the teeth section 33 on each of the laminated core segments 30 and winding the coil 12, the laminated core segments 30 are engaged with each other again. The protrusion section 48 of the connecting section 40 is forced into the connecting section 41 while elastically deforming the connecting section 41. When the connecting section 40 has been fitted into the connecting section 41, the original shape of the connecting section 41 is restored. Once the connecting sections 40 and 41 have been connected to each other, the stator core 10 does not get split, as long as the magnitude of the force does not exceed a level of magnitude that causes the interference section 53 to elastically deform as with the case described above.

In this embodiment, since the protrusion section 48 and the interference section 53 that are interfered with by each other due to the skew angle are formed in the connecting sections 40 and 41, in the case where the force that acts to split the stator core 10 is smaller than the force that acts to elastically deform the interference section 53 so as to force the protrusion section 48 to come out, the laminated core segments 30 do not get slit. At this time, since the forces that act on the respective laminated core segments 30 offset each other on the respective faces in the lamination direction, the laminated core segments 30 can be retained without welding or adhesive-bonding the connecting section 14 and 41. Therefore, workability and productivity of the assembly operation are improved. Furthermore, in the case where welding or adhesive-bonding is employed, an influence on magnetic circuits needs to be considered. However, such a problem does nod arise in the present embodiment.

Figure 8:
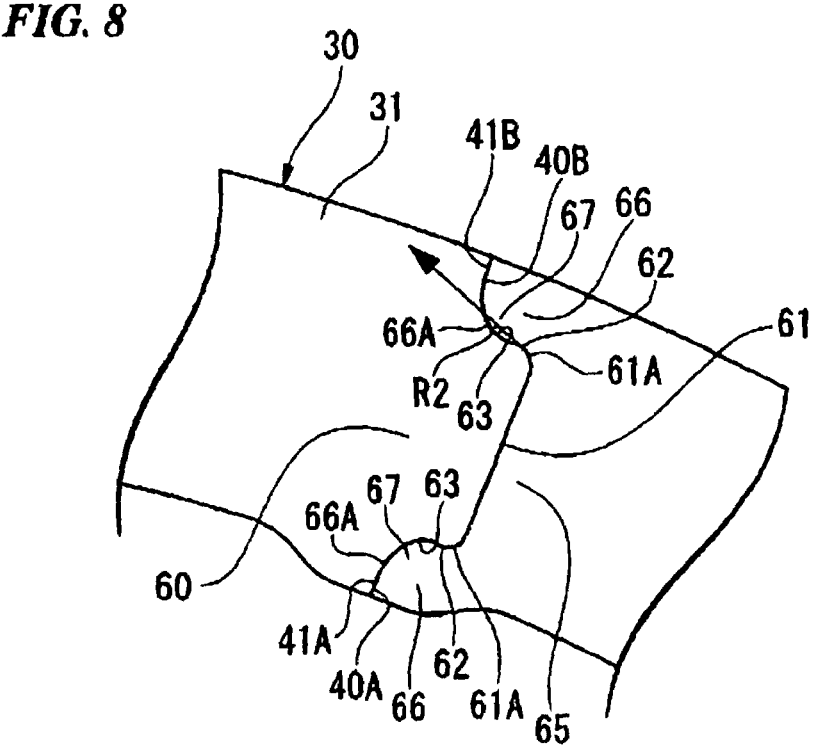
FIG. 8 is a drawing showing a modified example of a structure of a connecting section.
Figure 9:
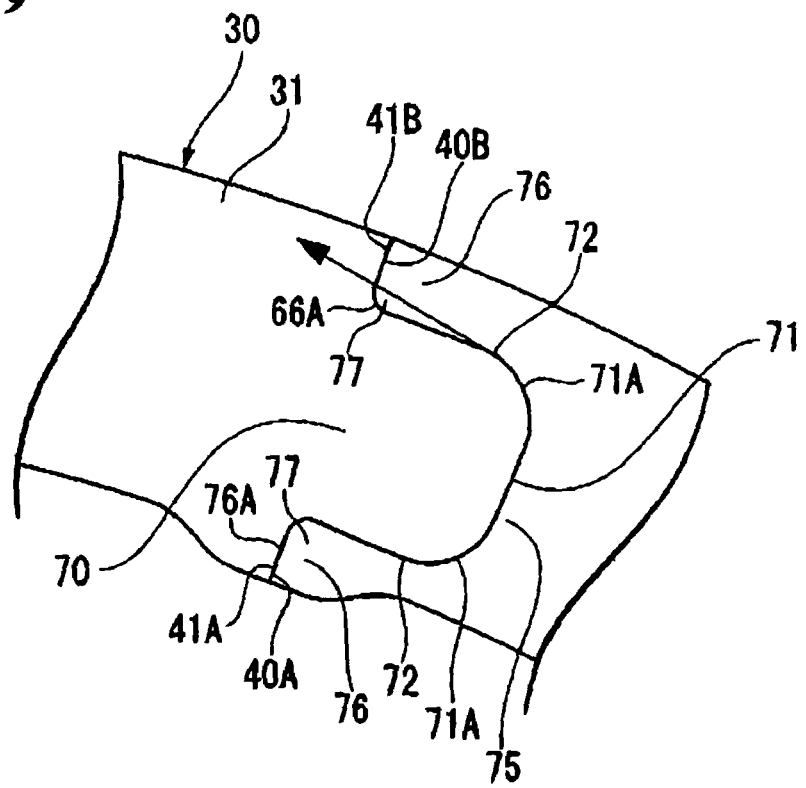
FIG. 9 is a drawing showing a modified example of the structure of the connecting section.

Here, modified examples of the connecting section are shown in FIG. 8 and FIG. 9.

In a connecting section 60 shown in FIG. 8, the length of a convex section 60 that engages in the circumferential direction is shorter, and a concave section 63 is formed so as to reduce its width while reaching protrusion sections 62 (interference sections) from abutting faces 40A and 40B. The protrusion sections 62 are respectively formed on the outer circumference side and on the inner circumference side, and protrude outward or inward from imaginary lines that pass through corner sections 61A of the tip end of convex sections 61 of an insertion direction and that close towards the insertion direction.

A connecting section 65 that connects to the connecting section 60 has arms 66 that form a concave section. On an opening end 66A side of the arm 66, there is formed an interference section 67 so as to fit the shape of the concave section 63 of the connecting section 60. This interference section 67 protrudes inward from an imaginary line that passes through the vertex of the protrusion section 62 of the connecting section 60 and that inclines by a/2 so as to close towards a receiving direction.

In these connecting sections 60 and 65, when the movement directions of the connecting sections 60 and 65 are off the circumferential direction, the protrusion section 62 and the interference section 67 interfere with each other, causing an engaging force to occur. As this engaging force is offset on both of the end sections of the respective core segments 30, the shape of the stator core 10 is retained. Furthermore, the connection is released when a force that causes the interference section 67 to elastically deform acts. A region surrounded by the movement path of the protrusion section 62 shown by the arrow, and the periphery of the interference section 67 is an interference region R2 for the protrusion section 62 and the interference section 67. The area of this interference region R2 is smaller than that of the interference region of the embodiment described above. However, the engagement becomes firm since the interference section 67 has intruded into the convex section 61. Therefore, the laminated core segments 30 can be made more unlikely to split compared to the above mentioned construction.

Moreover, in a connecting section 70 shown in FIG. 9, a convex section 71 extends from abutting faces 40A and 40B while maintaining its substantially constant width in the circumferential direction, and forms its tip end section with the same width. A protrusion section 72 has a corner section 71A having a curved surface on the tip end of the convex section 71, and an outer end of this corner section 71A is the protrusion section 72. An interference section 77 on the outer circumference side protrudes inward from an imaginary line that passes through the center of the corner section 71A and that closes towards the insertion direction.

A connecting section 75 that connects to the connecting section 70 has arms 76 that form a concave section. On an opening end 76A side of the arm 76, there is formed an interference section 77 so as to fit the shape of the connecting section 70. The interference section 77 on the inner circumference side protrudes outward from an imaginary line that passes through the protrusion section 72 of the connecting section 70 and that inclines by a/2 so as to close towards a receiving direction.

In these connecting sections 70 and 75, when the movement directions of the connecting sections 70 and 75 are off the circumferential direction, the protrusion section 72 and the interference section 77 interfere with each other, causing an engaging force to occur. As this engaging force is offset on both of the end sections of the respective core segments 30, the shape of the stator core 10 is retained. Furthermore, the connection is released when a force that causes the interference section 77 to elastically deform acts. Even if the connecting sections 70 and 75 are of shapes not having complex concaves and convexes, effects similar to that of the connecting sections 40 and 41 can be achieved.

Figure 10:
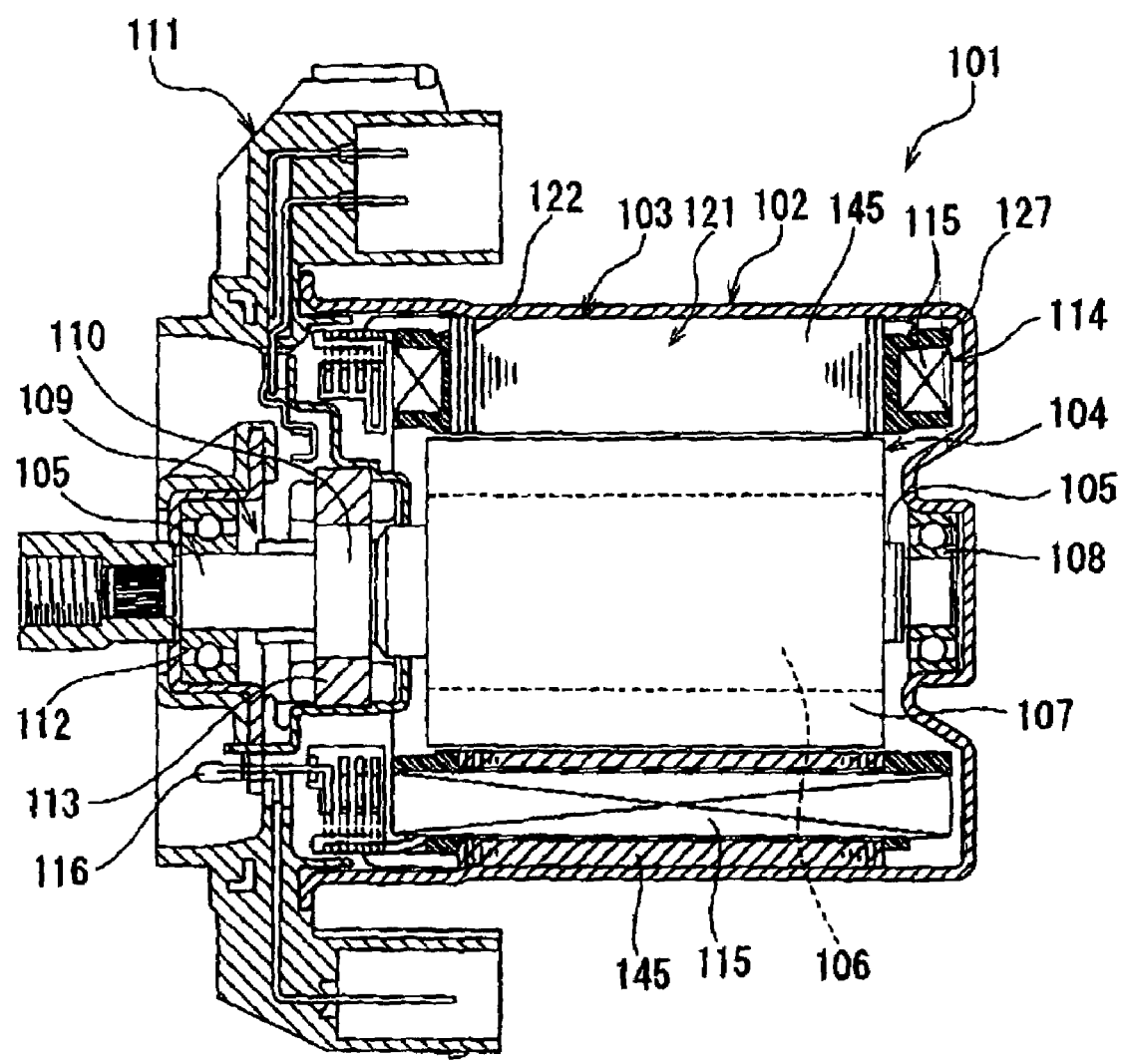
FIG. 10 is a sectional view of a brushless motor that uses a stator of the embodiment of the present invention.

Next, another embodiment of the present invention is described in detail, based on the drawings. FIG. 10 is a sectional view of a brushless motor (rotary electric machine) that uses a stator of the embodiment of the present invention. As shown in FIG. 10, a brushless motor 101 (hereinafter, abbreviated as motor 101) has a bottom ended cylindrical case 102. A stator 103 is housed within the case 102. The stator 103 is formed in a substantially ring shape, and its outer circumference face is in close contact with the inner circumference face of the case 102. Inside the stator 103 there is inserted a rotor 104. The rotor 104 has a rotation shaft 105, and on the rotation shaft 105 there is fixed a rotor core 106, on the outer circumference of which there is mounted a permanent magnet 107.

One end section of the rotation shaft 105 is freely rotatably supported on a bearing 108 that is press-fitted onto the bottom section of the case 102. On the other end side of the rotation shaft 105, there is mounted a rotor 110 of a rotation angle detection device 109. The other end section of the rotation shaft 105 is freely rotatably supported on a bearing 112 fixed on a bracket 111. The bracket 11 is formed from synthetic resin and is mounted so as to cover an opening section of the case 102. On the bracket 111, there are mounted a stator 113 of the rotation angle detection device 109 and a terminal 116 that leads out a coil winding 115 of a coil 114.

Figure 11:
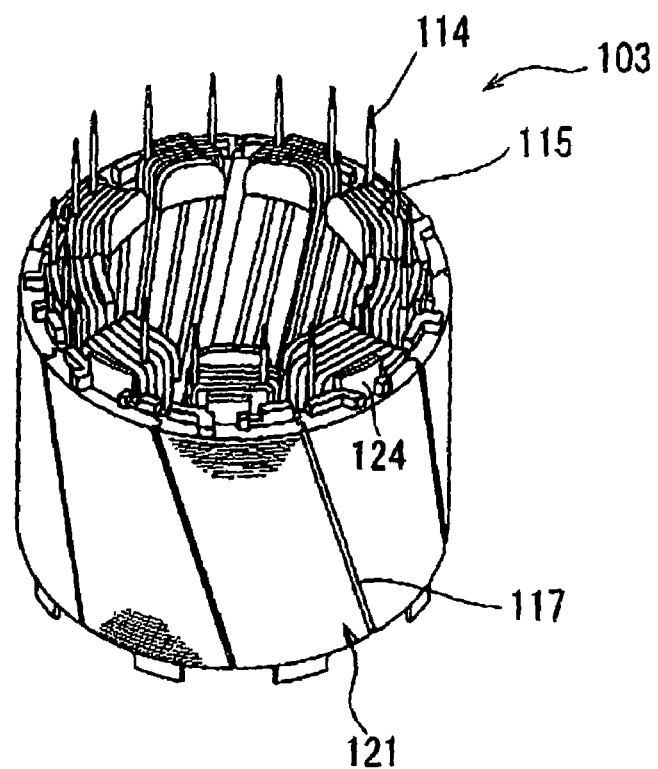
FIG. 11 is a perspective view showing a construction of the stator of the embodiment of the present invention.
Figure 12:
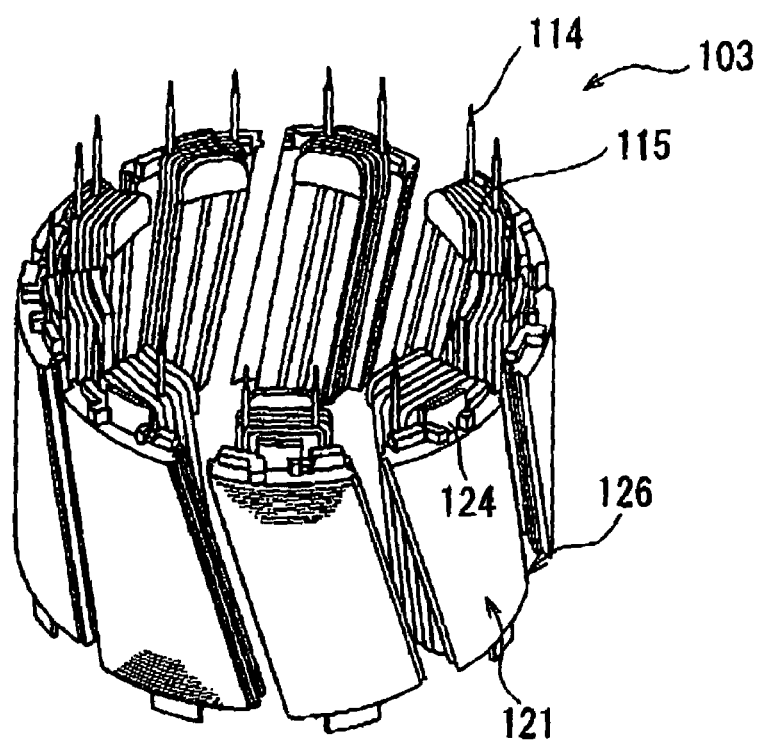
FIG. 12 is an exploded perspective view of the stator of FIG. 11.

FIG. 11 is a perspective view showing a construction of the stator 103 of the embodiment of the present invention, and FIG. 12 is an exploded perspective view showing the stator 103 of FIG. 11. As shown in FIG. 11 and FIG. 12, the stator 103 is constructed from nine stator segments 121 that are split in the circumferential direction at even intervals. The stator segment 121 is constructed such that insulators 124 are mounted on a split core unit (laminated core segment) 123 formed from laminated core pieces 122 made from magnetic steel plates, and the coil winding 115 is wound. In each of the core pieces 122, there are provided an outer circumference side section 122a arranged along the inner circumference of the case 102, and a teeth section 122b around which the coil winding 115 is wound. When the stator segments 121 have been installed, slots 125 are formed between the adjacent teeth sections 122b.

Both of the end sections of the outer circumference side section 122a are connection sections 126 (126a and 126b) that connect to the split core units 123 of the adjacent stator segments 121. Synthetic resin insulators 124 are mounted on the top and bottom end section of the split core unit 123. The coil winding 115 is wound around the outside of the insulators 124 so as to form the coil 114 around the teeth section 122b. When the stator segments 121 are installed in a ring shape, the coil 114 is housed within the slot 125. The split core unit 123 is tilted with respect to the axial direction, thereby forming a skew 117 in the stator 103.

Figure 13:
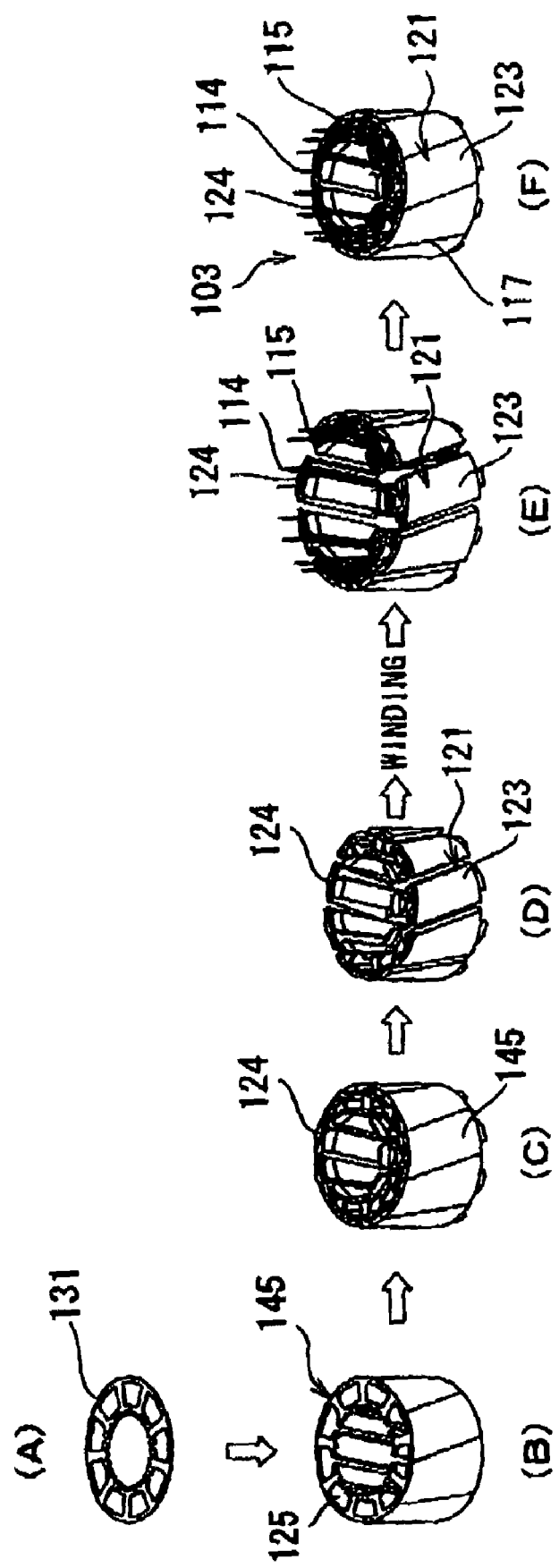
FIG. 13 is an explanatory drawing showing a general overview of the manufacturing steps for the stator.
Figure 14:
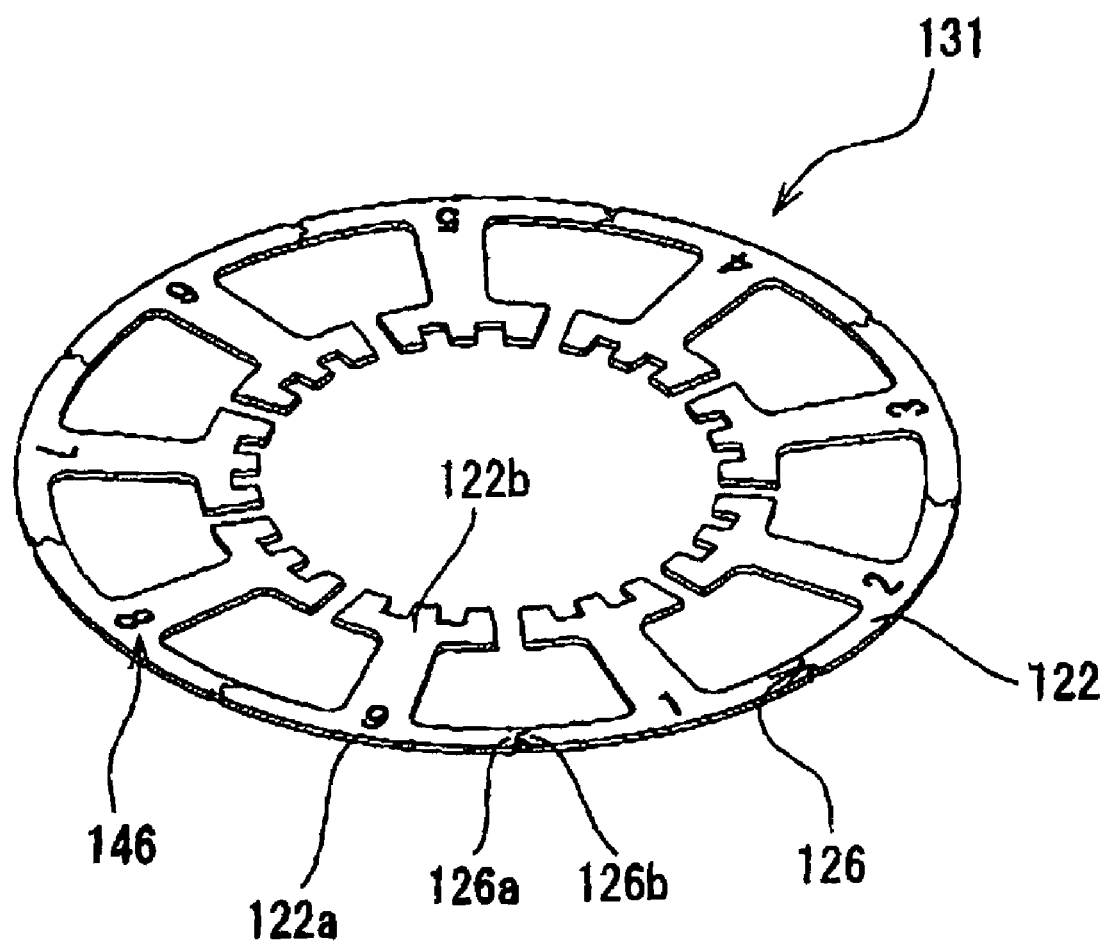
FIG. 14 is a perspective view showing a construction of a piece plate.
Figure 15:
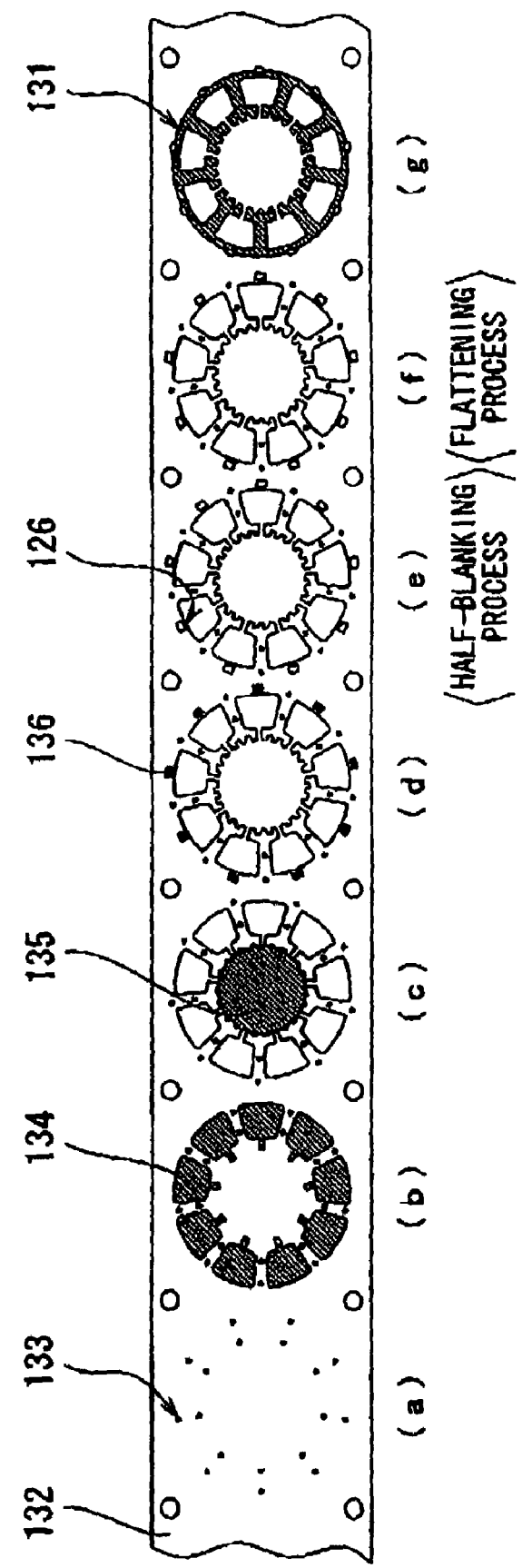
FIG. 15 is an explanatory drawing showing a processing step for the piece plate.

Such a stator 103 is formed as described below. FIG. 13 is an explanatory drawing showing a general overview of the manufacturing steps for the stator 103. In the stator 103 of the present invention, the single core pieces 122 are not individually punched out. The core pieces 122 are punched out so as to have a shape the same as that appears when they are connected, and then they are split to be used. Therefore, firstly in a step A shown in FIG. 13, a ring-shaped piece plate (plate member) 131 shown in FIG. 14 is formed by punching it out. The piece plate 131 is in a form in which a plurality of core pieces 122 is arranged in the circumferential direction and the connection sections 126 are engaged with each other by the convexes and concaves, thereby retaining the ring shape. FIG. 15 is an explanatory drawing showing a manufacturing step for the piece plate 131. As shown in FIG. 15, the piece plate 131 is formed from a magnetic steel plate (steel plate member) 132 by means of progressive pressing.

In the manufacturing step for the piece plate 131, bosses 133 are formed first (FIG. 15 (a)). The bosses 133 are arranged on the teeth section 122 so as to be used for locking the respective piece plates 131 when laminating the piece plates 131. The convex sections are formed on the top face of the piece plate 131 and the concave sections are formed on the bottom face of the piece plate 131 by the bosses 133, and by press-fitting and fixing the convex sections into the concave sections of the piece plates 131 adjacent to each other, the laminated piece plates 131 are prevented from parting from each other. By laminating the piece plates 131 while displacing the positions of the convex sections and the concave sections of the bosses 133, skewed lamination of the piece plates 131 can be achieved.

After processing the bosses, slot formation sections 134 in which the slots 125 are formed (FIG. 15 (b)), and an inner diameter section 135 of the piece plate 131 (FIG. 15 (c)) are punched out. After punching out the slot formation sections 134 and the inner diameter section 135, rectangular holes 136 (FIG. 15 (d)) are formed on the outside of the slot formation sections 134. These rectangular holes 136 are used when carrying out half-blanking and flattening in FIG. 15 (e) and subsequent steps. In addition, in order to make efficient use of the material, the portion of the inner diameter section 135 may be used for the rotor core 106. In this case a rotor plate formation step is placed between the steps (b) and (c). Moreover, any one of the steps (b) to (d) of FIG. 15 may be carried out first.

Figure 16:
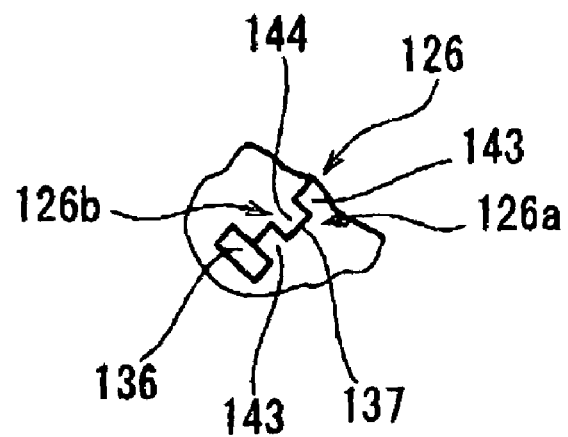
FIG. 16 is a partially enlarged plan view showing a construction of a connection section.
Figure 17A:
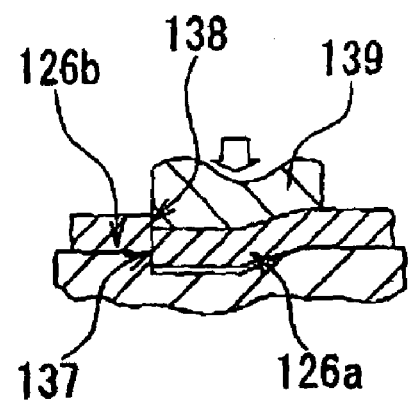
FIG. 17A is an explanatory drawing showing a half-blanking process step (e) in FIG. 15.
Figure 17B:
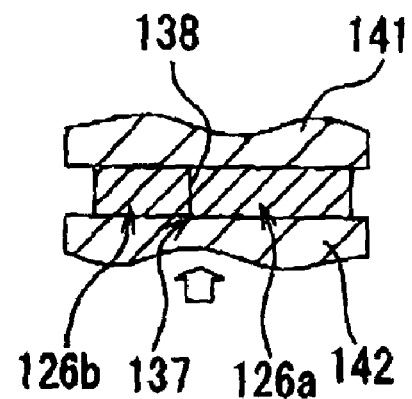
FIG. 17B is an explanatory drawing showing a flattening process step (f) in FIG. 15.

After forming the rectangular holes 136, the connection sections 126 are formed. FIG. 16 is a partially enlarged plan view showing a construction of a connection section 126. The connection sections 126 are formed in two steps (e) and (f) of FIG. 15. FIG. 17A is an explanatory drawing showing the half-blanking process step (e) in FIG. 15, and FIG. 17B is an explanatory drawing showing the flattening process step (f) in FIG. 15. As shown in FIG. 17A, in the half-blanking process step of (e) in FIG. 15, a connection section 126a on one side is pressed to half-blank along a connection line 137. At this time, since the rectangular hole 136 is formed on the outer end of the connection line 137, the connection section 126a can be easily and accurately half-blanked along the connection line 137, thereby improving the level of accuracy of the connection section 12. As a result of half-blanking, a sag surface and a shear surface are formed on a connection face 138 of the connection section 126b on the other side when a punch 139 is pressed in, and minute cracks occur in the lower portion of the shear surface.

After completing the half-blanking process, the flattening process (f) in FIG. 15 is carried out. In the flattening process, as shown in FIG. 17B, the top and bottom faces of the piece plate 131 are pressed between a flat punch 141 and a flat die 142. The connection section 126a that has been half-blanked in the half-blanking is again pressed upward by the punch 141 and the die 142. At this time, the minute cracks that occurred in the connection face 138 advance so as to form a breaking face, and the connection sections 126a and 126b are cut/separated from each other along the connection line 137. In general, in the case of the punching out process by means of pressing, burrs are formed in the lower portion of the breaking face. However, in the case of the piece plate 131, by combining the half-blanking process and flattening process, the connection section 126 can be cut along the connection line 137 without burrs occurring on the breaking face. As a result, the thickness of the piece plate 131 becomes constant around the entire circumference, and a variation in the thickness of the core piece 122 becomes smaller. Moreover, the flatness of the core piece 122 in the connection section 126 improves and no gaps occur in the connection face 138. As a result, the accuracy of the connection section 126 is improved.

After forming the connection section 126 in the steps (e) and (f) in FIG. 15, the periphery of the piece plate 131 is punched out (FIG. 15, (f)). As a result, the piece plate 131 shown in FIG. 14 is formed. At this time, due to the concave-convex engagement construction of the connection section 126, the piece plate 131 is not split into the respective core pieces 122 and retains its ring shape. As shown in FIG. 16, the connection section 126 is formed in a crank shape, and an outer engagement segment 143 is formed on the connection section 126a, and an inner engagement segment 144 that engages with the outer engagement segment 143 is formed on the connection section 126b. The outer engagement segment 143 elastically pinch-holds the inner engagement segment 144, and the respective core pieces 122 are thereby mutually bonded on the connection section 126, forming the ring-shaped piece plate 131. If the connection section 126 is made in such a crank shape, a greater area of connection between the core pieces 122 can be secured. As a result, a flow of magnetic flux within the stator 103 is improved, and a disturbance in magnetic flux can be suppressed even if a slight variation occurs in the dimension of the connection section 126.

Figure 18:
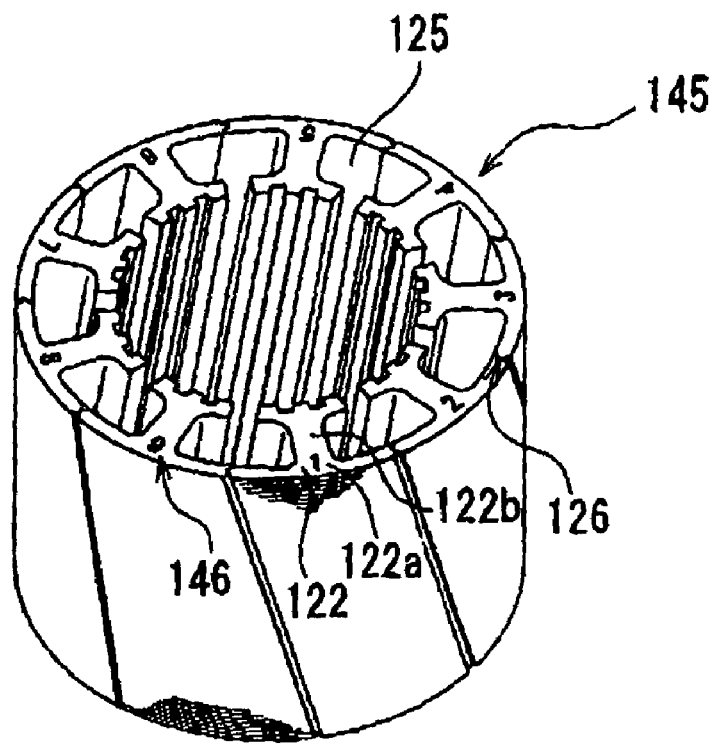
FIG. 18 is a perspective view showing a construction of the stator core.

The piece plate 131 formed in this way is laminated in a plurality of layers while displacing each one by a predetermined angle from one before it in the circumferential direction. Furthermore, by skew-laminating a predetermined number of the piece plates 131, a stator core 145 shown in FIG. 18 is formed (step B in FIG. 13). In this case, since the piece plates 131 are laminated while the respective core pieces 122 maintain the disk shape without being separated from each other, the accuracy of the dimensions of the stator core 145 can be easily achieved and the accuracy of the inner diameter can improved. At completion of laminating the piece plates 131, unit numbers 146 (arrangement displays; 1 to 9 in the present embodiment) for differentiating each of the split core units 123 are marked on top faces 145a of the stator cores 145.

Figure 19:
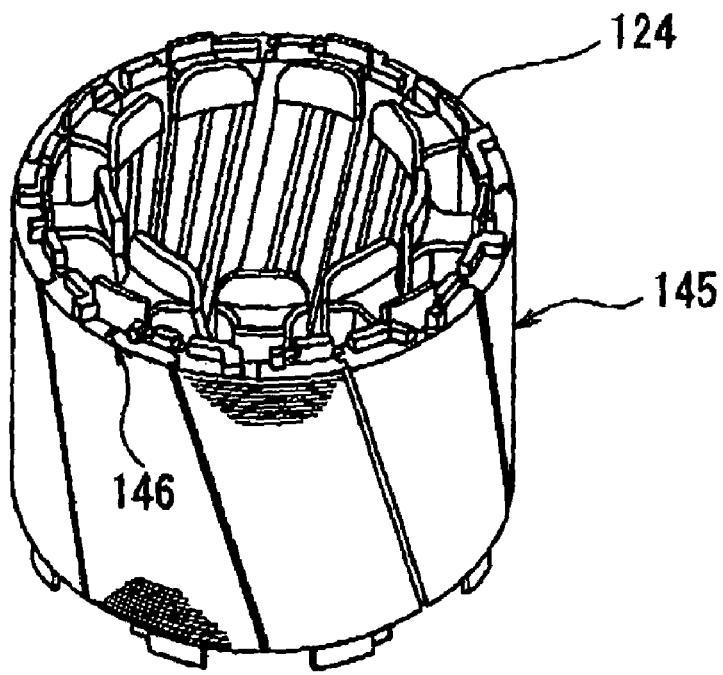
FIG. 19 is a perspective view showing a construction of the stator core with insulators being attached thereon.
Figure 20:
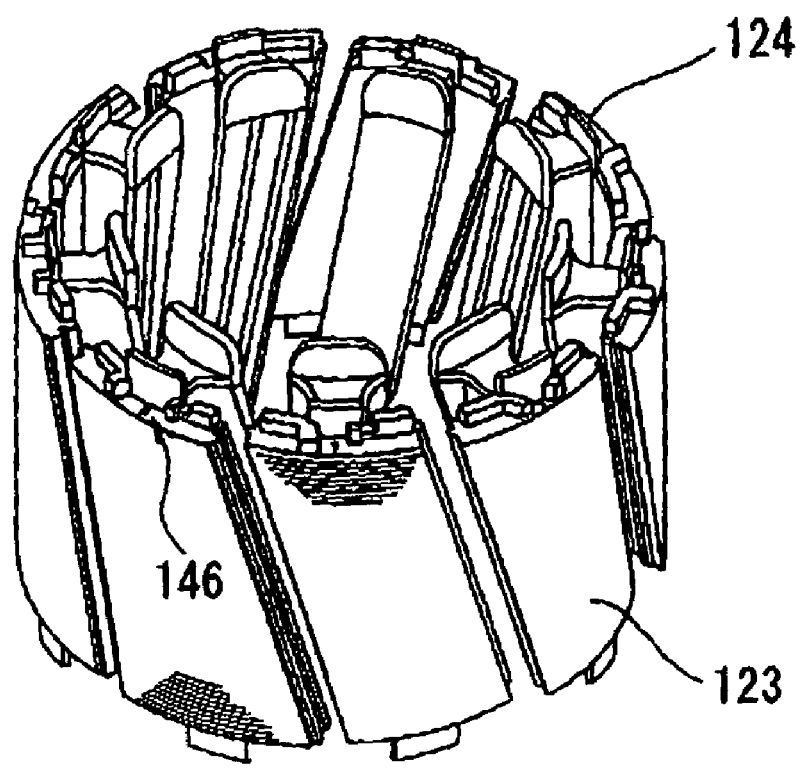
FIG. 20 is a perspective view showing the stator core of FIG. 19 being split in the circumferential direction.

As shown in FIG. 19O, the insulator 124 is mounted on the stator core 145 in which the piece plates 131 are laminated (step C in FIG. 13). After mounting the insulator 124, the entire stator 103 is split once in the circumferential direction in order to form the coil windings (step D in FIG. 13). As a result, a plurality of the split core units 123 provided with the insulators 124 shown in FIG. 20 is formed. The coil winding 115 is wound individually on each of the split core units 123 (step E in FIG. 13) so as to form the stator segment 121 shown in FIG. 14. Then, in the stator 103, these stator segments 121 (split core units 123) are re-installed in a combination the same as that at the time prior to splitting (step F in FIG. 13). That is to say, according to the unit numbers 146 marked on the respective split core units 123, the split core units 123 are gathered in the original combination so as to form the stator 103 shown in FIG. 11. As described above, since the unit numbers 146 are displayed on the split core units 123, the units can be correctly installed in the original combination.

When re-installing the split core units 123, the connection sections 126a and 126b are engaged with each other so as to retain the entire stator 103 in a cylindrical shape. As mentioned above, the connection section 126 is elastically engaged by the outer engagement segment 143 and the inner engagement segment 144. Therefore, while it is easy to detach in the process D, the retention force can be secured and maintained after the installation in step F. Since the stator 103 is housed within the case 102 as shown in FIG. 10, it does not get separated in the circumferential direction after being installed in the motor 101, and the connection strength in the connection section 126 is sufficient as long as the retention force is secured up to step D and from step F until the process of motor installation.

Figure 21:
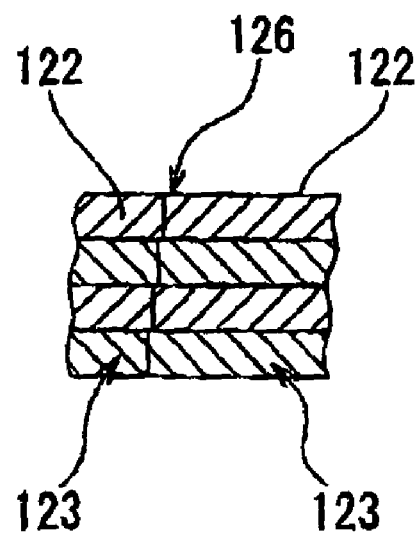
FIG. 21 is an explanatory drawing showing a state of the connection section in the stator shown in FIG. 19.
Figure 22:
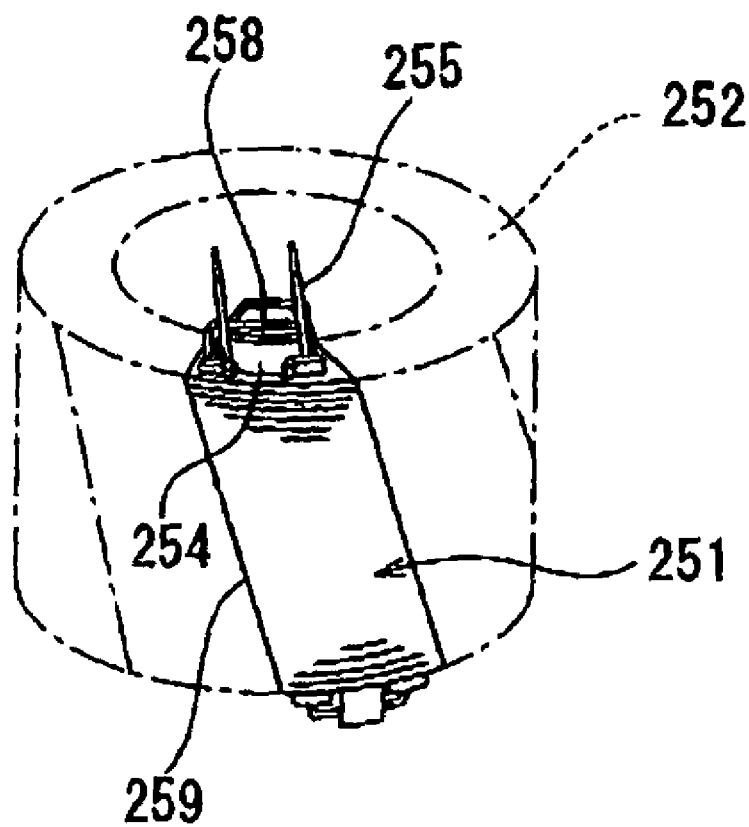
FIG. 22 is a perspective view showing a construction of a conventional stator segment.
Figure 23:
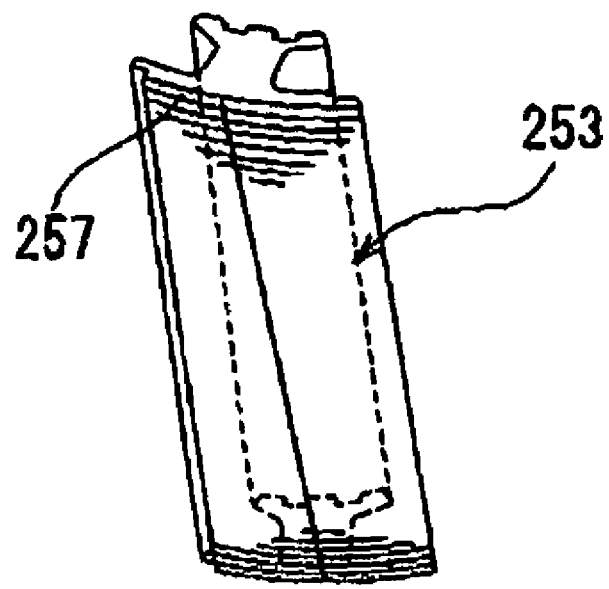
FIG. 23 is a perspective view showing a construction of a split core unit of the stator segment shown in FIG. 22.
Figure 24:
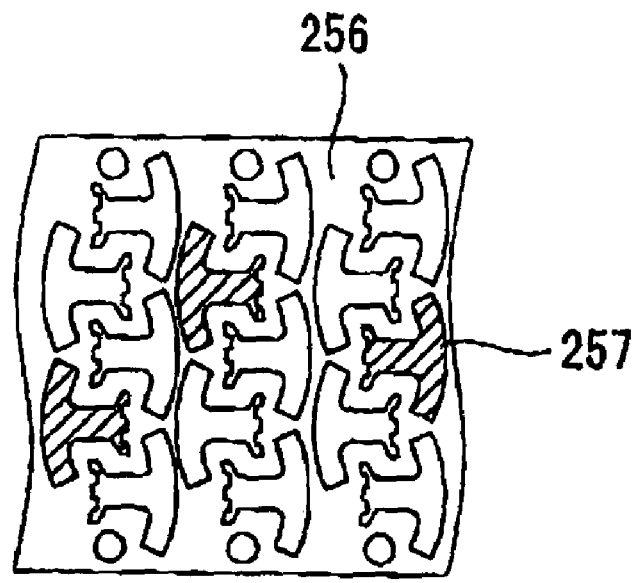
FIG. 24 is an explanatory drawing showing a processing method for a conventional piece plate.
Figure 25A:
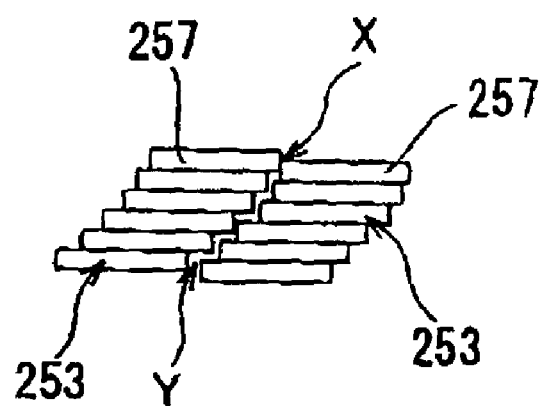
FIG. 25A is an explanatory drawing showing a state of a connection section in the conventional stator.
Figure 25B:
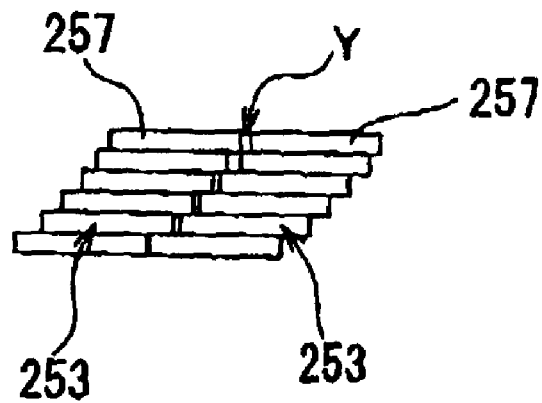
FIG. 25B is an explanatory drawing showing a state of the connection section in the conventional stator.

As described above, in the stator 103, the piece plate 131 is formed in which the core pieces 122 are connected in the circumferential direction. After once splitting the stator cores 145, in which the piece plates 131 are laminated, and winding the coil winding thereon, the stator cores 145 are re-connected in the same combination to manufacture the stator 103. In this case, since the stator core 145 is integrally formed by laminating the piece plates 131 and there is a synergistic effect of an improvement in the flatness due to the flattening and the equalized plate thickness, each of the split core units 123 is formed so as to have a substantially equal lamination thickness. Moreover, since the split core units 123 adjacent to each other are bonded with the split core unit 123 the same as that in the half-blanking process, the connection accuracy of the connection face 138 can be maintained at a high level. As a result, the split core units 123 are connected to each other without any gaps as shown in FIG. 21, and without having displacement or rattling in the connection section 126. Furthermore, the skew 117 between the split core units 123 adjacent to each other remains the same as that in the original stator core 145. As a result, no uneven gaps occur between the units.

Therefore, in the stator 103 according to the present invention, the plate thickness of the core piece 122 or an error that occurs during lamination do not cause a variation to occur in the dimensions of each of the split core units 123. As a result, steps or uneven gaps between the split core units 123 that were observed in the conventional stator can be prevented. Accordingly, a variation in magnetic flux within the stator 103 can be suppressed, and a reduction in the characteristics of the rotary electric machine due to an impaired magnetic balance can be prevented. Moreover, a cogging torque increase due to a disturbance in a magnetic balance can also be suppressed. For example, in the case where the motor 101 is used as a driving source for an electric power steering device, an improved steering feel can be achieved as a result of a reduced cogging torque.

The present invention is not limited to the above described embodiments, and may be modified in various ways without departing from the scope of the invention.

For example, in the above described embodiments, an example has been shown in which the stator and the rotary electric machine of the present invention are used for a brushless motor that is a driving source of a power steering device. However, the use of the stator and the rotary electric machine, and the form of the motor are not limited to that shown in the example. That is to say, the present invention can be applied to a driving source for on-vehicle electric products such as a power slide door, a wiper device, and a power window, and to rotary electric machines such as a motor to be used in other electric products. Moreover, the present invention can be applied not only to a brushless motor but also to a brush motor.

INDUSTRIAL APPLICABILITY

According to the present invention, assembly operation of a stator core becomes easier, and a magnetically excellent connecting structure can be obtained. Moreover, a variation in magnetic flux within a stator caused by steps or uneven gaps in the split core units can be suppressed, and a reduction in the characteristic of a rotary electric machine due to an impaired magnetic balance and a cogging torque can be reduced.

The invention claimed is:

1. A motor having a stator core formed by combining laminated core segments, which are laminated while said core segments are skewed, in a ring shape, wherein
a convex section is provided on one end section in the circumferential direction of said laminated core segment, and a concave section is provided on the other end section in the circumferential direction so as to be able to connect in the circumferential direction to said convex section of another said laminated core segment, and said convex section and said concave section have interference sections that cause said convex section and said concave section to interfere with each other due to skewing in said laminated core segment when a force that acts to separate said convex section and said concave section is displaced from the circumferential direction.

2. A motor according to claim 1, wherein said interference sections are a protrusion section that partially protrudes between the tip end and the base end of said convex section, and an end section formed on said concave section so as to correspond to said protrusion section.

3. A motor according to claim 2, wherein said protrusion section protrudes from an imaginary line that passes through a corner section of the tip end of said convex section and that inclines by an angle half of a skew angle with respect to the circumferential direction so as to open towards the base end side of said convex section.

4. A motor according to any one of claim 1 through claim 3, wherein said interference sections are formed respectively on the inner circumference side and on the outer circumference side of said convex section and said concave section.

5. A motor according to any one of claim 1 through claim 4, wherein said interference sections have shapes that do not cause interference when said convex section and said concave section are moved in the circumferential direction.

6. A motor according to claim 1, wherein said motor is a rotary electric machine provided with a rotor having a permanent magnet and said stator arranged on the outer circumference side of said rotor, and said stator is provided with a plurality of laminated core segments arranged in a ring shape along the circumferential direction.

7. A motor according to claim 6, wherein each of said laminated core segments is formed by laminating a plurality of core pieces.

8. A stator of a rotary electric machine according to claim 6, wherein said laminated core segments are formed by splitting, along the circumferential direction, said stator core that is formed by laminating a plurality of ring-shaped plate members, and said stator is formed by re-connecting said laminated core segments, which have been split-formed from the same said stator core and which have individually had winding wires wound thereon, in a combination the same as that at the time of splitting.

9. A stator of a rotary electric machine according to claim 8, wherein said laminated core segments have arrangement displays that show the state of combination at the time of splitting.

10. A stator of a rotary electric machine according to claim 7, wherein said split core segments are formed by splitting, along the circumferential direction, said stator core that is formed by laminating a plurality of said ring-shaped plate members in which said core pieces are connected along the circumferential direction, and said core piece has connection sections that are cut-formed from a steel plate member by half-blanking said steel plate member, on which said plate member is formed, from one face side and then pressing it from the other face side, and said connection sections connect said core pieces adjacent to each other.

11. A stator of a rotary electric machine according to claim 10, wherein said connection section has engaging sections to and from which said core pieces can be attached or removed.

12. A stator of a rotary electric machine according to either one of claim 10 and claim 11, wherein a cut-assisting hole is provided adjacent to a portion of said steel plate member in which said connection section is formed.

13. A manufacturing method of a stator of a rotary electric machine according to claim 6, wherein said split core unit is formed by splitting, in the circumferential direction, a stator core that is formed by laminating a plurality of ring-shaped plate members, and a winding wire is individually wound on said split core unit, and then said split core units, which have been split-formed from the same said stator core, are re-connected in a combination the same as that at the time of splitting to form said stator.

14. A manufacturing method of a stator of a rotary electric machine according to claim 7, wherein a ring-shaped plate member in which said core pieces are connected in the circumferential direction is punch-formed from a steel plate member, and said steel plate member is half-blanked from one face side and is then pressed from the other face side, thereby cut-forming from said steel plate member, connection sections in between adjacent said core pieces for connecting said core pieces, and said stator core is formed by laminating a plurality of said plate members, and said Stator core is split to form said laminated core segment.

15. A rotary electric machine according to claim 6, wherein said split core units are formed by splitting, along the circumferential direction, said stator core that is formed by laminating a plurality of ring-shaped plate members, and said stator is formed by re-connecting said laminated core segments, which have been split-formed from the same said stator core and which have individually had winding wires wound thereon, in a combination the same as that at the time of splitting.

16. A rotary electric machine according to claim 7, wherein said split core units are formed by splitting, along the circumferential direction, said stator core that is formed by laminating a plurality of said ring-shaped plate members in which said core pieces are connected along the circumferential direction, and said core pieces have connection sections that are cut-formed from a steel plate member by half-blanking said steel plate member, on which said plate member is formed, from one face side and then pressing it from the other face side, and said connection sections connect said core pieces adjacent to each other.

* * * * *